US 10,563,335 B2

(12) United States Patent
Kim et al.

(10) Patent No.: US 10,563,335 B2
(45) Date of Patent: Feb. 18, 2020

(54) WASHER

(71) Applicant: LG ELECTRONICS INC., Seoul (KR)

(72) Inventors: Youngwoo Kim, Seoul (KR); Jayoen Kim, Seoul (KR); Joohyeon Oh, Seoul (KR); Darae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/528,944

(22) PCT Filed: Oct. 27, 2015

(86) PCT No.: PCT/KR2015/011347
§ 371 (c)(1),
(2) Date: May 23, 2017

(87) PCT Pub. No.: WO2016/085130
PCT Pub. Date: Jun. 2, 2016

(65) Prior Publication Data
US 2017/0260675 A1    Sep. 14, 2017

(30) Foreign Application Priority Data

Nov. 26, 2014  (KR) .................... 10-2014-0166181
Dec. 17, 2014  (KR) .................... 10-2014-0182067
Dec. 17, 2014  (KR) .................... 10-2014-0182069

(51) Int. Cl.
*D06F 33/02*     (2006.01)
*D06F 37/04*     (2006.01)
(Continued)

(52) U.S. Cl.
CPC .............. *D06F 33/02* (2013.01); *D06F 37/04* (2013.01); *G06F 3/0482* (2013.01); *G06F 3/04817* (2013.01)

(58) Field of Classification Search
CPC .... D06F 39/005; D06F 33/02; D06F 2216/00; D06F 2214/00; D06F 2058/2803;
(Continued)

(56) References Cited

U.S. PATENT DOCUMENTS 8,402,796 B2 *  3/2013  Han ................. D06F 39/12
                                              68/13 R
9,026,232 B2 *  5/2015  Fadell ............... F24F 11/30
                                              700/17
(Continued)

FOREIGN PATENT DOCUMENTS

KR    10-2006-0063000 A    6/2006
KR    10-2006-0117425 A   11/2006
(Continued)

*Primary Examiner* — Justin S Lee
(74) *Attorney, Agent, or Firm* — Birch, Stewart, Kolasch & Birch, LLP

(57) ABSTRACT

The present invention relates to a washer, and the washer provides a plurality of washer settings and is formed so as to enable the changing of at least one option involved in a specific washer setting when the specific washer setting is selected from the plurality of washer settings, and comprises: an operation part formed to be rotatable so as to select the specific washer setting and the at least one option involved in the specific washer setting; a display part formed to selectively display, on the radial inner side of the operation part, input items including at least one of washer setting icons for the plurality of washer settings, option icons for the at least one option respectively involved in the plurality of washer settings, and a start icon; one command input part provided on the front surface of the operation part, and formed to input the washer setting selected by the operation part, change the at least one option, and input a signal for executing and stopping the selected washer setting; and a control part for controlling the display part such that preset information is displayed on the display part on the basis of (Continued)

the signals from the operation part and the command input part.

15 Claims, 10 Drawing Sheets

(51) Int. Cl.
    *G06F 3/0481*     (2013.01)
    *G06F 3/0482*     (2013.01)

(58) Field of Classification Search
    CPC ......... D06F 2058/2883; D06F 2202/10; D06F 2204/065; D06F 2210/00; D06F 29/00; D06F 39/12; D06F 58/28
    See application file for complete search history.

(56) References Cited

U.S. PATENT DOCUMENTS

| | | | | |
|---|---|---|---|---|
| 2006/0101591 A1* | 5/2006 | Jo | ........................ | D06F 39/005 8/158 |
| 2007/0271528 A1* | 11/2007 | Park | ..................... | G06F 3/0482 715/810 |
| 2008/0042868 A1* | 2/2008 | Lee | .................... | G05B 19/0423 340/4.32 |
| 2008/0105001 A1* | 5/2008 | Jeong | ..................... | D06F 33/02 68/12.02 |
| 2012/0012721 A1 | 1/2012 | Baier | | |
| 2012/0056827 A1* | 3/2012 | Kim | ......................... | D06F 33/02 345/173 |
| 2012/0110747 A1* | 5/2012 | Yum | .................... | A47L 15/0063 8/137 |
| 2012/0131504 A1* | 5/2012 | Fadell | .................. | F24D 19/1084 715/810 |
| 2012/0203379 A1* | 8/2012 | Sloo | ................... | G05D 23/1902 700/276 |
| 2012/0229521 A1* | 9/2012 | Hales, IV | ............ | F24F 11/0012 345/684 |
| 2013/0024799 A1* | 1/2013 | Fadell | ................ | G05D 23/1902 715/771 |
| 2013/0290902 A1* | 10/2013 | Martin | .................. | D06F 39/005 715/823 |
| 2015/0169194 A1* | 6/2015 | Ban | ........................ | D06F 39/005 715/771 |
| 2015/0345068 A1* | 12/2015 | Coffman | ................. | D06F 58/28 715/771 |

FOREIGN PATENT DOCUMENTS

| | | | |
|---|---|---|---|
| KR | 20060117425 A | * | 11/2006 |
| KR | 10-2014-0005484 A | | 1/2014 |
| KR | 10-1386818 B1 | | 4/2014 |

\* cited by examiner

WASHER

CROSS REFERENCE TO RELATED APPLICATIONS

This application is the National Phase of PCT International Application No. PCT/KR2015/011347, filed on Oct. 27, 2015, which claims priority under 35 U.S.C. 119(a) to Patent Application No. 10-2014-0166181, filed in Republic of Korea on Nov. 26, 2014, Patent Application No. 10-2014-0182067, filed in Republic of Korea on Dec. 17, 2014, and Patent Application No. 10-2014-0182069, filed in Republic of Korea on Dec. 17, 2014, all of which are hereby expressly incorporated by reference into the present application.

TECHNICAL FIELD

The present invention relates to a laundry machine, the user interface of which is convenient. More particularly, the present invention relates to a laundry machine that provides a simple and intuitive user interface.

BACKGROUND ART

A representative example of a laundry machine is a washer that washes laundry. A dryer that dries laundry is another example of a laundry machine. Of course, a washer/dryer that both washes and dries laundry is another example of a laundry machine.

In recent years, a refresher that refreshes laundry using hot air or steam without washing using water has come onto the market. The refresher is also another example of a laundry machine.

Hereinafter, a description will be made based on a washer, which is a representative example of a laundry machine. However, the present invention may be applied to other laundry machines, as long as the laundry machines are not exclusive or contradictive.

FIG. 1 shows a control panel of a conventional washer.

The control panel provides a user interface. In general, therefore, the control panel is provided at the front surface of the washer such that a user may easily access and manipulate the control panel. The control panel may be provided with input units or selection units, such as various kinds of buttons, for user manipulation and various kinds of display units for providing information to the user. Such input units or selection units and display units may be collectively referred to as a user interface.

The main function of the washer is washing. Consequently, a course selection unit 110 or a main function selection unit for selecting various kinds of washing courses is provided such that the user can select a course using the course selection unit. For example, the course selection unit 110 may be configured in the form of a rotary knob. In order for the user to easily select a course, the control panel 100 may be provided with a course display unit 111. The user may manipulate the course selection unit 110 so as to correspond to the course display unit such that a desired washing course can be selected. When the course selection unit 110 is manipulated, a selected course may be recognized through the course display unit 111.

As shown in FIG. 1, the course display unit 111, in which various washing courses are displayed, is provided around the rotary knob 110. The user may rotate the rotary knob 110 to select a corresponding washing course. A display unit 121 for displaying the selected washing course may be provided such that the user can easily recognize the selected washing course through the display unit 121. That is, the user may easily recognize the selected washing course through the course display unit 111 and the light emitting diode (LED) display unit 121, which is configured to blink. The course display unit 111 may be printed on the front surface of the control panel.

An option selection unit 120 for selecting an optional function, which may be added or changed during the execution of the main function, may be provided. The option selection unit 120 may be variously configured. FIG. 1 shows an option input unit 120 for selecting options related to washing 120a, rinsing 120b, spin drying 120c, water temperature 120d, drying 120e, steam 122, and delay 123, by way of example. An option display unit 122 for displaying whether such an option has been selected may also be provided. In the same manner, the option display unit may be realized through a light emitting diode (LED).

The control panel 100 may be provided with a state display unit 130 for displaying the state of the washer. The current operational state of the washer, the state of the course or the option selected by the user, and time information may be displayed through the state display unit 130. Generally, the state display unit 130 may be constituted by a liquid crystal display.

For example, in the case in which the washer is performing a rinsing step, a message "rinsing" may be displayed. In the case of waiting for user input of a course, a message "input a washing course" may be displayed. In addition, the current time or the time taken until the washer completes the washing course (i.e. remaining time) may also be displayed.

Meanwhile, the control panel 100 may be provided with a power input unit 140 for supplying power to the washer and interrupting the supply of power to the washer and a start/pause input unit 150 for starting or temporarily stopping the operation of the washer.

The conventional control panel 100 described above and the laundry machine including the same have the following problems.

It is difficult to realize an additional user interface in addition to the construction of a basic user interface due to space limitations of the control panel 100. Of course, the user interface may be complicatedly and variously realized in the control panel 100, which, however, requires excessive concentration and prior knowledge of the user. In addition, it may be difficult to manufacture the control panel 100, or a high-capacity memory may be required, with the result that the price of the washer may be excessively increased.

Furthermore, the functions of the selection units 110 and 120 and the display units 111, 121, and 122 are predetermined or set, with the result that extension to provide additional functions is not easy. In addition, the various selection units 110 and 120 are exposed to the user. That is, a selection unit that is not necessary at a specific time, as well as a necessary selection unit, is exposed to the user. As a result, the user cannot use various functions that are provided by the laundry machine if the user is not skilled.

In addition, the number of selection units 110 and 120 and display units 111, 121, and 122 is large, and these units are spread, with the result that the user interface is very inconvenient. That is, in order for the user to recognize information input to the laundry machine, the eyes of the user must be turned upon the respective components.

In recent years, a minimal design has been adopted in electric home appliances. In addition, the necessity for a simple and intuitive user interface, rather than a complicated user interface, has been increased. However, it is not easy to realize such a simple and intuitive user interface for a laundry machine. The reason for this is that a simple and intuitive user interface must be provided in a manner that includes at least the entirety of the user interface shown in FIG. 1. In addition, it is necessary for a user who is familiar with a conventional user interface to adapt himself or herself to a new user interface without great difficulty.

It is not easily to change the conventional user interface due to the various difficulties described above.

Meanwhile, as shown in FIG. 1, the number of courses that are basically provided by the laundry machine is predetermined. For example, FIG. 1 shows 12 washing courses. Consequently, it is difficult to add a new washing course, and, even when the new washing course is added, the added course must be selected through a separate option button, rather than through the course selection unit 110.

That is, according to circumstances, even a course at the same level must be selected through another selection unit (e.g. a shoe refreshing course 124), rather than the course selection unit 110. As a result, it is not easy for the user to use the added washing course if the user is not very skilled.

DISCLOSURE

Technical Problem

The present invention has been made in view of the above problems, and it is an object of the present invention to provide a laundry machine having a simple and intuitive user interface.

It is another object of the present invention to provide a laundry machine designed such that a user interface is not spread across the control panel but is concentrated at a specific position.

It is another object of the present invention to provide a laundry machine that is capable of improving user convenience when using a manipulation unit.

It is another object of the present invention to provide a laundry machine that is capable of reducing the number of input units.

It is another object of the present invention to provide a laundry machine that is capable of eliminating or minimizing the amount of text printed on a control panel.

It is a further object of the present invention to provide a laundry machine configured such that a washing course and an option can be easily selected through a display screen.

Technical Solution

In accordance with the present invention, the above objects can be accomplished by the provision of a laundry machine that provides a plurality of washing courses, and when a specific washing course is selected from among the washing courses, is capable of changing at least one option accompanying the specific washing course, the laundry machine including a rotatable manipulation unit configured to select a specific washing course and to select at least one option accompanying the specific washing course, a display unit configured to selectively display input items, including one or more selected from among washing course icons indicating the washing courses, an option icon indicating at least one option accompanying each of the washing courses, and a start icon, inside the manipulation unit in a radial direction thereof, a command input unit provided at the front surface of the manipulation unit for inputting a washing course selected by the manipulation unit, changing the at least one option, and inputting a signal for executing and stopping the selected washing course, and a controller configured to control the display unit such that predetermined information is displayed on the display unit based on signals from the manipulation unit and the command input unit.

The display unit may be configured to selectively display the input items in a circular display zone corresponding to the manipulation unit, the manipulation unit being formed in a circular ring shape, and the controller may control the display unit such that the input items are displayed in the circumferential direction of the circular display zone.

The controller may control the display unit such that information about the selected washing course and information about the selected option are selectively displayed in the central part of the circular display zone.

The laundry machine may further include a power input unit configured to input power to the laundry machine, wherein, when the manipulation unit is rotated by a predetermined angle or more or when a signal input through the command input unit is maintained for a predetermined time or more, power from an external power source may be supplied to the laundry machine via the power input unit.

When the signal input through the command input unit is maintained for the predetermined time or more in the state in which the power is supplied to the laundry machine, the power input unit may interrupt the supply of power to the laundry machine from the external power source.

The input of power, selection of a washing course, change of an option, start of the selected washing course, and setting of delay time may be performed by rotating the manipulation unit and inputting a command through the command input unit.

The command input unit may be provided at the front surface of the manipulation unit so as to be located at one side of the circular ring-shaped manipulation unit in the circumferential direction thereof.

The command input unit may be provided at the front surface of the circular ring-shaped manipulation unit so as to be located at a 6 o'clock position, and a command may be input when the command input unit is pushed by a user.

When power is input to the laundry machine, the controller may control the display unit such that a course selection screen is displayed in the display zone, and the controller may control the display unit such that a plurality of washing course icons and an additional course icon are displayed on the course selection screen in the circumferential direction of the display zone.

The controller may control the display unit such that the washing course icons and the additional course icon displayed in the display zone are sequentially lit in response to the rotation of the manipulation unit.

When a signal is input through the command input unit in the state in which the additional course icon is lit, the controller may control the display unit such that a plurality of predetermined additional washing course icons other than the washing course icons is displayed in the circumferential direction of the display zone.

When one of the washing course icons is selected in response to the rotation of the manipulation unit and the selected washing course is input through the command input unit, the controller may control the display unit such that an option setting screen is displayed in the display zone, and the controller may control the display unit such that one or more selected from among an option icon accompanying the selected washing course, a delay icon, and a start icon are displayed on the option setting screen in the circumferential direction of the display zone.

A back icon may be further displayed on the option setting screen, and when the back icon is selected in response to the rotation of the manipulation unit and a signal is input through the command input unit, the controller may control the display unit such that the course selection screen is displayed again in the display zone.

The controller may control the display unit such that the start icon is activated only on the option setting screen.

When the delay icon is selected in response to the rotation of the manipulation unit and a command is input through the command input unit, the controller may control the display unit such that a delay setting screen is displayed in the display zone in the form of an analog clock, a delay time is selected in response to the rotation of the manipulation unit, and delay setting is completed through the command input unit.

The washing courses may include one or more selected from among normal washing, baby clothes, boiling, speed wash, allergy care, steam cleaning, functional clothes, bedding cleaning, cold water wash, lingerie/wool, bedclothes, and rinsing/spin drying.

The option may include one or more selected from among washing intensity, wash water temperature, the number of rinses, and spin-drying intensity.

Advantageous Effects

According to the present invention, it is possible to provide a laundry machine having a simple and intuitive user interface.

In addition, according to the present invention, it is possible to provide a laundry machine designed such that a user interface is not spread across the control panel but is concentrated at a specific position.

In addition, according to the present invention, it is possible to provide a laundry machine that is capable of improving user convenience when using a manipulation unit.

In addition, according to the present invention, it is possible to provide a laundry machine that is capable of reducing the number of input units.

In addition, according to the present invention, it is possible to provide a laundry machine that is capable of eliminating or minimizing the amount of text printed on a control panel.

In addition, according to the present invention, it is possible to provide a laundry machine configured such that a washing course and an option can be easily selected through a display screen.

BEST MODE

Figure 1:
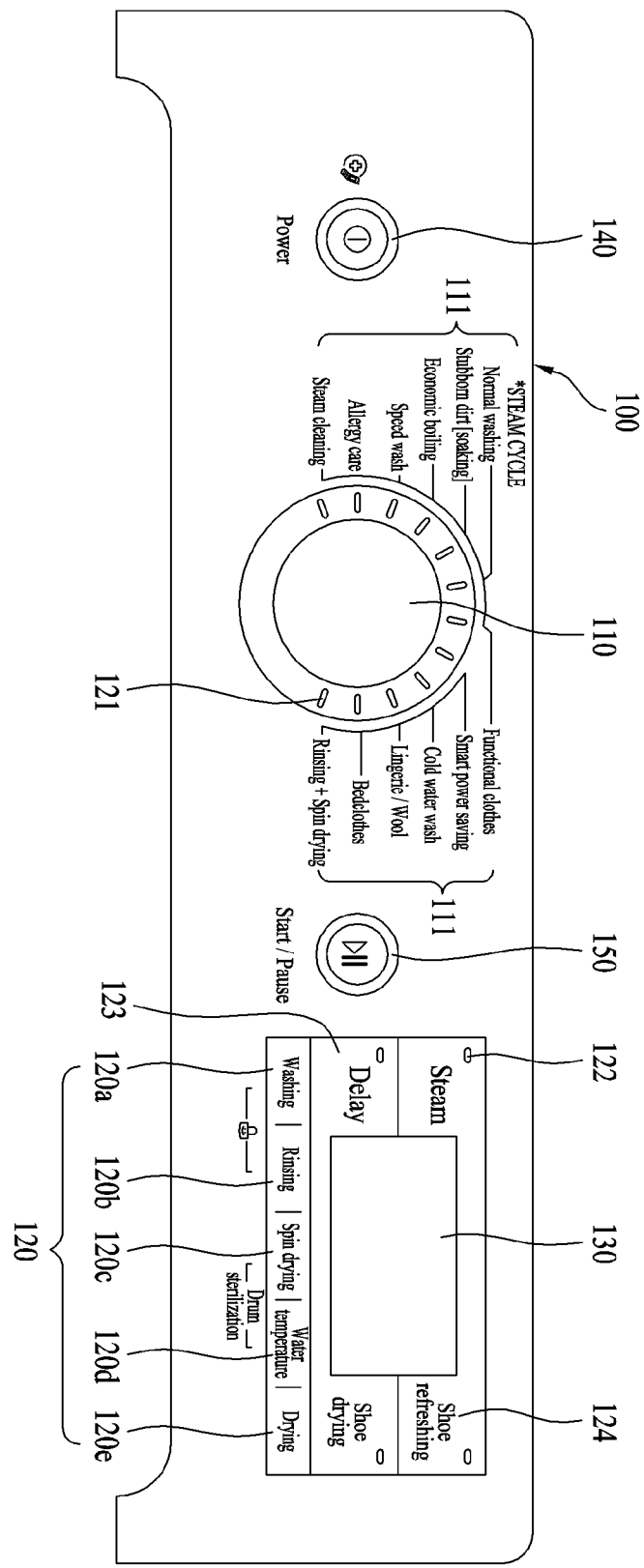
FIG. 1 is a front view showing a user interface of a conventional laundry machine.

Hereinafter, a laundry machine according to the present invention will be described in detail with reference to the accompanying drawings. The accompanying drawings, which show an illustrative form of the present invention, are provided only to describe the present invention in detail, and do not limit the technical scope of the present invention.

In addition, the same reference numbers will be used throughout the drawings to refer to the same or like parts, and duplicate descriptions thereof will be omitted. In the drawings, the sizes and shapes of elements may be exaggerated or reduced for convenience of description.

Hereinafter, a laundry machine according to an embodiment of the present invention will be described in detail with reference to the accompanying drawings.

Figure 2:
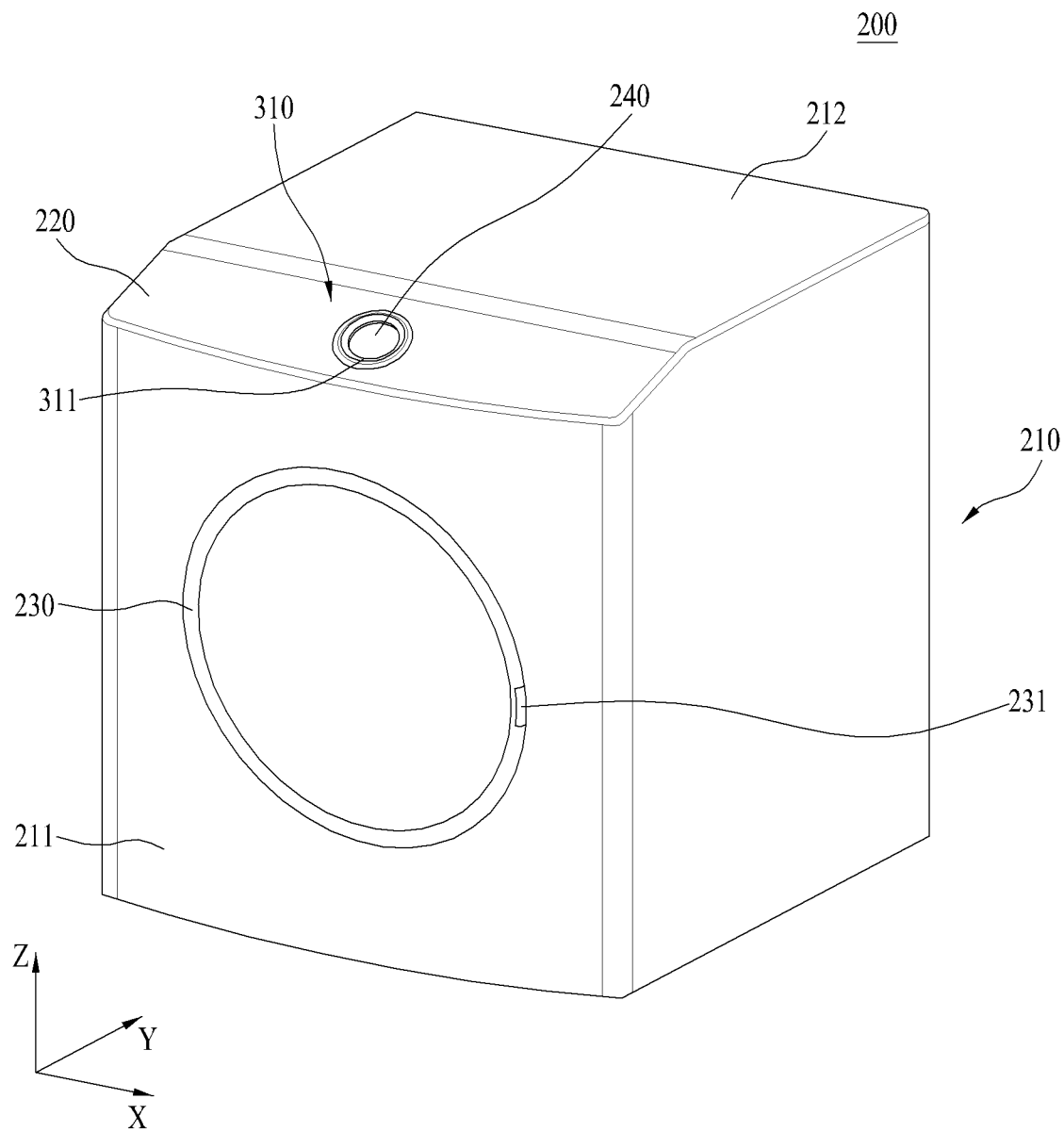
FIG. 2 is a view showing a laundry machine including a manipulation unit and a display unit according to an embodiment of the present invention.

FIG. 2 is a view showing a laundry machine including a manipulation unit and a display unit according to an embodiment of the present invention.

In FIG. 2, the X-axis direction is defined as the lateral direction of the laundry machine, the Y-axis direction is defined as the forward-rearward direction of the laundry machine, and the Z-axis direction is defined as the height direction of the laundry machine, for the convenience of description.

Referring to FIG. 2, a laundry machine 200 according to an embodiment of the present invention may provide a plurality of washing courses. When a specific washing course is selected from among the washing courses, at least one option accompanying the specific washing course may be changed.

The washing courses may include one or more selected from among normal washing, baby clothes, boiling, speed wash, allergy care, steam cleaning, functional clothes, bedding cleaning, cold water wash, lingerie/wool, bedclothes, and rinsing/spin drying.

In addition, the at least one option may include one or more selected from among washing intensity, wash water temperature, the number of rinses, and spin-drying intensity.

In the embodiment of the present invention, the laundry machine 200 may include a cabinet 210 that defines the external appearance thereof, a control panel 220 provided at the upper part of the front of the cabinet 210, a manipulation unit 310 installed at the control panel 220, a command input unit 311 provided at the front surface (i.e. the upper surface) of the manipulation unit 310, a display unit 240 for displaying a plurality of washing courses and at least one option based on the driving of the manipulation unit 310, and a controller (see FIG. 5) for controlling the display unit 240.

The cabinet 210 may define the entire external appearance of the laundry machine 200. In addition, a tub (not shown) for receiving wash water and a drum (not shown) rotatably provided in the tub for receiving laundry may be provided in the cabinet 210.

The tub and the drum are well known, and a detailed description thereof will be omitted.

In addition, a door 230 configured to be opened in order to introduce laundry into the drum or to remove the laundry from the drum may be provided at the front surface 211 of the cabinet 210. A handle 231 configured to be gripped by a user to open and close the door 230 may be provided at one side of the door 230.

In addition, the middle part of the door 230 may be made of a transparent material such that the interior of the drum is visible.

The control panel 220 may be provided at the upper part of the front of the cabinet 210 so as to be inclined downward in the forward direction of the cabinet 210.

For example, the control panel 220 may be provided at the front part of the upper surface 212 of the cabinet 210. In addition, the control panel 220 may be provided at the upper side of the front surface 211 of the cabinet 210.

The control panel 220 may be integrally formed with the upper surface 212 of the cabinet 210. That is, the front part of the upper surface of the cabinet 210 may be inclined downward, and the portion of the upper surface 212 of the cabinet 210 that is inclined downward may constitute the control panel 220.

For example, the upper surface 212 of the cabinet 210 may include a flat part that is parallel to the installation surface of the cabinet 210, an inclined part that is inclined from the flat part toward the front of the cabinet, and an interface part that interconnects the flat part and the inclined part. The inclined part may constitute the control panel 220. In addition, the flat part, the inclined part, and the interface part may be integrally formed.

In addition, the control panel 220 may be disposed such that the front edge of the control panel 220 contacts the upper edge of the upper surface 212 of the cabinet 210. That is, the control panel 220 may be configured so as not to protrude further toward the front of the cabinet than the front surface 211 of the cabinet 210.

The manipulation unit 310 may be installed at the control panel 220. More specifically, the manipulation unit 310 may be installed at the central part of the control panel 220 in the lateral direction thereof. The manipulation unit 310 may be disposed such that at least a portion of the manipulation unit 310 is exposed outside the control panel 220.

In addition, the manipulation unit 310 may be rotatably configured to select a specific washing course among a plurality of washing courses and to select at least one option accompanying the specific washing course.

The command input unit 311 may be provided at the front surface of the manipulation unit 310. For example, the command input unit 311 may be provided at the front surface of the manipulation unit 310 so as to be located at one side of the manipulation unit 310 in the circumferential direction thereof. Preferably, the command input unit 311 may be provided at the lowermost side of the front surface of the manipulation unit 310.

In addition, the command input unit 311 may be configured as a portion of the manipulation unit 310. That is, a portion (or one side) of the manipulation unit 310 in the circumferential direction thereof may constitute the command input unit 311.

Even when the manipulation unit 310 is rotated, therefore, the command input unit 311 may be located at the lowermost side of the manipulation unit 310 (i.e. at the portion of the manipulation unit 310 at a 6 o'clock position when viewed from the front of the laundry machine 200). That is, the lowermost portion of the manipulation unit 310 may constitute the command input unit 311, which may be pushed by the user, irrespective of the rotation of the manipulation unit 310.

The command input unit 311 may be configured to allow the user to input the course selected by the manipulation unit 310 and to change (or input) the at least one option. In addition, the command input unit 311 may be configured to allow the user to input a command (i.e. a signal) for performing and/or stopping the selected course.

In addition, the command input unit 311 may be configured to be pushed by external pressure. That is, the user may push the command input unit 311 to input the course selected by the manipulation unit 310 and to change (or input) the at least one option. In addition, the user may push the command input unit 311 to input a command for performing a course that has been selected in advance.

The display unit 240 may be configured to selectively display a plurality of washing courses and at least one option based on the driving (i.e. the rotation) of the manipulation unit 310. The display unit 240 may be disposed at the lower side of the manipulation unit 310.

In addition, the display unit 240 may be configured to selectively display input items including one or more selected from among washing course icons indicating a plurality of washing courses, an option icon indicating at least one option accompanying each of the washing courses, and a start icon.

More specifically, the display unit 240 may selectively display input items including one or more selected from among the washing course icons, the option icon indicating the at least one option, and the start icon.

In particular, the input items may be selectively displayed on the display unit 240 inside the manipulation unit 310 in the radial direction thereof.

That is, the input items realized on the display unit 240 may be displayed on the display unit 240 at positions corresponding to a manipulation unit through-hole 312 (see FIGS. 2 and 3) formed inside the manipulation unit 310 in the radial direction thereof such that the input items displayed on the display unit 240 can be recognized through the manipulation unit through-hole 312.

In other words, the display unit 240 may have a circular display zone, in which the input items are displayed, at a position corresponding to the manipulation unit through-hole 312.

Consequently, information about (i.e. the description of) the input items, the course, and the option may be displayed in the circular display zone.

The display unit 240 may be controlled by the controller such that the input items displayed in the circular display zone may be displayed in the circumferential direction of the circular display zone.

In addition, the controller may control the display unit 240 such that information about a selected washing course and information about a selected option are selectively displayed at the central part of the circular display zone.

The controller (see FIG. 5) may be configured to control the display unit 240 based on a signal from the manipulation unit 310 and the command input unit 311. Specifically, the controller may control the display unit 240 such that predetermined information is displayed on the display unit 240 based on a signal from the manipulation unit 310 and the command input unit 311.

The predetermined information may include information about the input items, the course and options selected by the manipulation unit 310.

The controller will be described in detail later with reference to other figures.

Meanwhile, the manipulation unit 310 may be included in a manipulation mechanism 300 (see FIGS. 3 and 4) installed at the control panel 220. Hereinafter, the manipulation mechanism 300 will be described in detail with reference to FIGS. 3 and 4.

Figure 3:
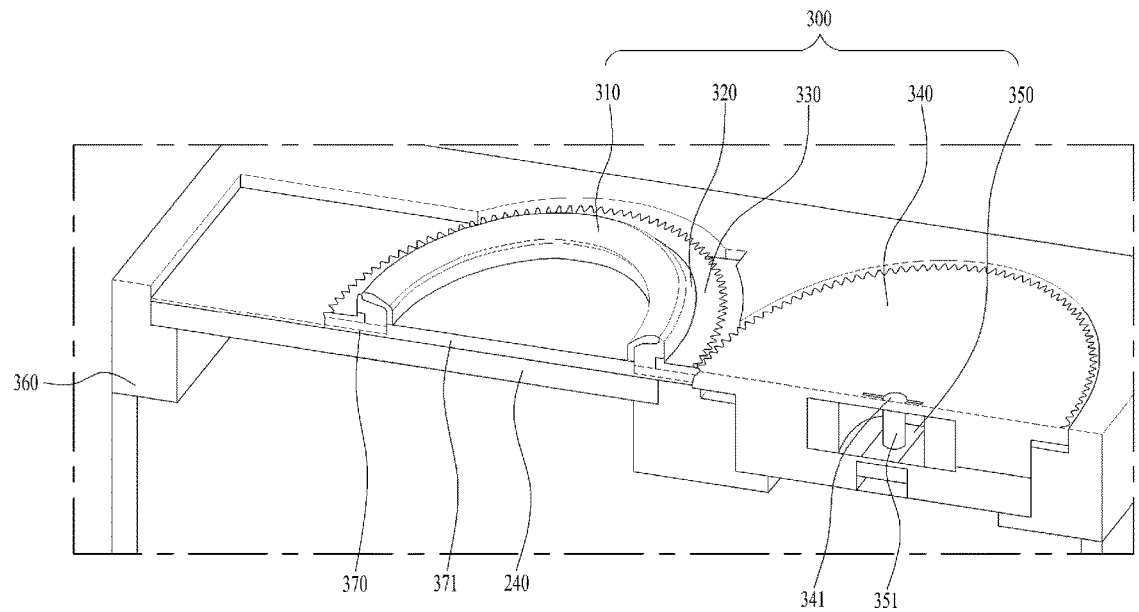
FIG. 3 is a sectional view of the manipulation unit and the display unit shown in FIG. 2.
Figure 4:
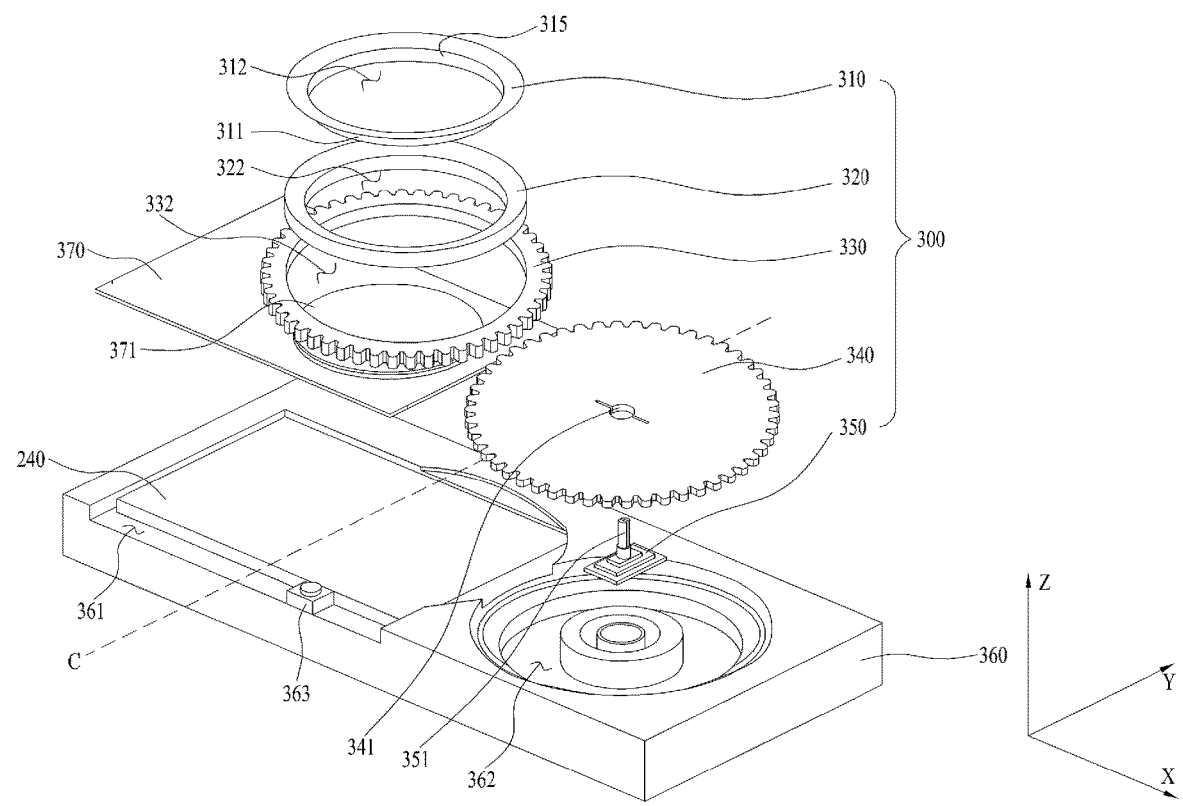
FIG. 4 is an exploded perspective view of the manipulation unit and the display unit shown in FIG. 2.

FIG. 3 is a sectional view of the manipulation unit and the display unit shown in FIG. 2, and FIG. 4 is an exploded perspective view of the manipulation unit and the display unit shown in FIG. 2.

In FIG. 4, the X axis indicates the lateral direction, the Z axis indicates the upward-downward direction (i.e. the height direction), and the Y axis indicates the forward-rearward direction, for the convenience of description.

Referring to FIGS. 2 to 4, the manipulation unit 310 may be formed in the shape of a circular ring including a through-hole 312 (hereinafter, referred to as a "manipulation unit through-hole") formed in the central part thereof. That is, the manipulation unit 310 may be circular and rotatable, and the manipulation unit through-hole 312 may be formed inside the manipulation unit 310 in the radial direction thereof.

In addition, as previously described, the manipulation unit 310 may be disposed so as to be exposed outside the control panel 220 such that the user can rotate the manipulation unit 310.

For example, only the upper surface of the manipulation unit 310 may be exposed from the control panel 220 such that the user can rotate the manipulation unit 310 in the state of being in contact with the upper surface of the manipulation unit 310 using his/her finger.

The display unit 240 may be disposed at the lower side of the manipulation unit 310. That is, the display unit 240 may be disposed at the lower side of the manipulation unit 310 such that information or a screen displayed on the display unit 240 can be recognized through the manipulation unit through-hole 312.

Consequently, the user may easily recognize the information or the screen displayed on the display unit 240 through the manipulation unit through-hole 312 at the front of the laundry machine 200.

Meanwhile, the laundry machine 200 according to the embodiment of the present invention may include a manipulation mechanism 300, which includes the manipulation unit 310.

The manipulation mechanism 300 may further include a first gear unit 330 configured to be rotated in the state of being interlocked with the rotation of the manipulation unit 310, a second gear unit 340 configured to be engaged with the first gear unit 330, and an encoder 350 configured to recognize the rotation of the second gear unit 340.

That is, the manipulation mechanism 300 may further include the manipulation unit 310, the first gear unit 330, the second gear unit 340 and the encoder 350.

The first gear unit 330 may be disposed at the lower side of the manipulation unit 310 so as to be rotated together with the rotation of the manipulation unit 310. More specifically, the first gear unit 330 may be configured to be rotated in the state of being interlocked with the rotation of the manipulation unit 310 when the user rotates the manipulation unit 310, and may be formed at the lower side of the manipulation unit 310 so as to receive the rotational force of the manipulation unit 310.

The second gear unit 340 may be disposed at one side of the first gear unit 330 so as to be engaged with the first gear unit 330. More specifically, the second gear unit 340 may be formed at the side surface of the first gear unit 330 so as to be engaged with the first gear unit 330. When the first gear unit 330 is rotated, therefore, the second gear unit 340 may also be rotated. That is, the second gear unit 340 may be rotated in the state of being interlocked with the rotation of the first gear unit 330.

Spur gears may be used as the first gear unit 330 and the second gear unit 340. In addition, the first gear unit 330 may be provided with a first gear unit through-hole 322 having a larger diameter than the manipulation unit through-hole 312. Consequently, at least a portion of the inner circumferential surface 315 of the circular ring-shaped manipulation unit 310 may extend through the first gear unit through-hole 322.

That is, the inner circumferential surface 315 of the circular ring-shaped manipulation unit 310 may protrude downward (i.e. toward the first gear unit 330), and the inner circumferential surface 315 of the manipulation unit 310 may be configured to extend through the first gear unit through-hole 322.

The encoder 350 may be connected to the second gear unit 340 to recognize the rotation of the manipulation unit 310.

Specifically, the encoder 350 may include a rotation recognition unit 351 configured to recognize the rotation of the second gear unit 340. The rotation recognition unit 351 may be fastened to a connection hole 341 formed at the center of rotation of the second gear unit 340. When the second gear unit 340 is rotated, therefore, the rotation recognition unit 351 of the encoder 350 may also be rotated, and the rotation pitch (or the rotational angle) of the second gear unit 340 may be recognized by the encoder 350.

As described above, the rotation of the manipulation unit 310 may be transmitted to the encoder 350 via the first gear unit 330 and the second gear unit 340. The encoder 350 may recognize the rotation pitch (or the rotational angle) of the manipulation unit 310 and may transit the same to a controller (see FIG. 5), a description of which will follow.

That is, the rotational signal of the manipulation unit 310 may be transmitted to the controller via the encoder 350.

Meanwhile, the manipulation mechanism 300 may further include a support member 320 disposed between the manipulation unit 310 and the first gear unit 330. Consequently, the rotation of the manipulation unit 310 may be transmitted to the first gear unit 330 via the support member 320.

That is, the support member 320 may be disposed at the lower side of the manipulation unit 310 and at the upper side of the first gear unit 330. In addition, the support member 320 may be engaged with the manipulation unit 310 and the first gear unit 330 such that the rotational force of the manipulation unit 310 is transmitted to the first gear unit 330.

As described above, the support member 320 may be disposed between the manipulation unit 310 and the first gear unit 330 so as to be engaged with the manipulation unit 310 and the first gear unit 330.

When the manipulation unit 310 is rotated, therefore, the rotation recognition unit 351 of the encoder 350 may also be rotated via the support member 320, the first gear unit 330, and the second gear unit 340, and the encoder 350 may recognize the rotation pitch (or the rotational angle) of the manipulation unit 310.

Meanwhile, the laundry machine 200 according to the embodiment of the present invention may further include a transparent member 370 disposed between the manipulation unit 310 and the display unit 240.

For example, the transparent member 370 may be disposed between the manipulation unit 310 and the display unit 240, and may have a cross-sectional size corresponding to the cross-sectional size of the display unit 240. That is, the transparent member 370 may be formed in a shape corresponding to the shape of the front surface of the display unit 240. In other words, the transparent member 370 may be disposed on the display unit 240 so as to cover the front surface of the display unit 240.

More specifically, the transparent member 370 may be disposed between the first gear unit 330 and the display unit 240. That is, the manipulation unit 310, the support member 320, the first gear unit 330, the transparent member 370, and the display unit 240 may be sequentially disposed from top to bottom.

The transparent member 370 may be made of transparent acryl. Consequently, information or a screen displayed on the display unit 240 may be recognized by the user from the outside through the transparent member 370 and the manipulation unit through-hole 312.

In addition, the transparent member 370 may be provided with a circular protrusion 371 that protrudes toward the manipulation unit 310. That is, the circular protrusion 371 may be formed at the transparent member 370 such that the circular protrusion 371 protrudes toward the manipulation unit 310 so as to rotatably support the manipulation unit 310. The circular protrusion 371 may be formed at a position corresponding to the manipulation unit through-hole 312.

In addition, as previously described, the inner circumferential surface 315 of the manipulation unit 310 may be formed so as to protrude downward (i.e. toward the circular protrusion 371). Consequently, the inner circumferential surface 315 of the manipulation unit 310 may be rotatably engaged with the circular protrusion 371.

Of course, the diameter of the inner circumferential surface 315 of the manipulation unit 310 may be greater than the diameter of the circular protrusion 371 such that the inner circumferential surface 315 of the manipulation unit 310 is rotatably engaged with the circular protrusion 371.

Consequently, the manipulation unit 310 may be rotated about the circular protrusion 371. That is, the circular protrusion 371 may be configured to function as the axis of rotation of the manipulation unit 310.

The circular protrusion 371 may be disposed so as to be biased to one side of the display unit 240 in the lateral direction thereof (e.g. toward the right side of the display unit 240 in the lateral direction thereof) from the center of the display unit 240 in the lateral direction thereof (i.e. from the center line C of the display unit 240 in the lateral direction thereof).

That is, the display unit 240 may be formed in a quadrangular shape when viewed from the front thereof, and the manipulation unit 310 may be formed in the shape of a circular ring that is smaller than the display unit 240. In addition, the second gear unit 340 may be disposed at one side of the display unit 240 so as not to cover an image or a screen on the display unit 240.

Consequently, the circular protrusion 371 may be disposed so as to be biased to one side of the display unit 240 in the lateral direction thereof from the center of the display unit 240 in the lateral direction thereof such that the rotation of the first gear unit 330 in response to the rotation of the manipulation unit 310 is easily transmitted to the second gear unit 340 disposed at one side of the display unit 240.

In addition, the display unit 240 may be formed in a quadrangular shape when viewed from the front thereof, and the screen or the image displayed on the display unit 240 may be displayed in a circular shape corresponding to the manipulation unit through-hole 312 formed in the manipulation unit 310 so as to be recognized through the manipulation unit through-hole 312.

That is, a circular image or image may be displayed on the display unit 240 at a position corresponding to the manipulation unit through-hole 312.

Consequently, the manipulation unit through-hole 312, the circular protrusion 371, and the screen displayed on the display unit 240 may be formed in a circular shape. For example, the display unit 240 may be constituted by a liquid crystal display (LCD). That is, the display unit 240 may be constituted by an LCD that is capable of displaying a quadrangular screen, and the screen or the image displayed on the display unit 240 may be displayed in a circular shape at a position corresponding to the manipulation unit through-hole 312 and the circular protrusion 371.

Meanwhile, the laundry machine 200 may further include a support body 360 coupled to the rear surface of the control panel 220.

That is, the support body 360 may be coupled to the rear surface of the control panel 220 so as not to be exposed outside the laundry machine 200.

In addition, the support body 360 may be provided with a first installation seat 361 for installing the display unit 240 and a second installation seat 362 for installing the encoder 350 and the second gear unit 340.

Specifically, the first installation seat 361 for installing the display unit 240 may be formed at one side of the support body 360 in the lateral direction thereof, and the second installation seat 362 for installing the encoder 350 and the second gear unit 340 may be formed at the other side of the support body 360 in the lateral direction thereof.

The first installation seat 361 and the second installation seat 362 may be disposed adjacent to each other. In addition, the first installation seat 361 and the second installation seat 362 may be disposed parallel to each other.

In addition, the encoder 350 may be installed at the central part of the second installation seat 362, and the second gear unit 340 may be installed at the second installation seat 362 above the encoder 350.

The rotation recognition unit 351 provided at the encoder 350 may be rotatably installed at the center of the second gear unit 340. That is, the rotation recognition unit 351 may be connected to the connection hole 341 formed in the center of the second gear unit 340 so as to be rotated in the state of being interlocked with the rotation of the second gear unit 340.

Meanwhile, the support body 360 may be provided with an input button 363 such that a command input through the command input unit 311 provided at the manipulation unit 310 is transmitted to the controller (see FIG. 5) to control the display unit 240.

Specifically, the input button 363 may be disposed at the first installation seat 361. For example, the input button 363 may be disposed at a portion of the first installation seat 361 where the display unit 240 is not disposed.

More specifically, the input button 363 may be disposed at the first installation seat 361 at the front side of the display unit 240. In addition, the input button 363 may be disposed at the lower side of the manipulation unit 310 at a position corresponding to the command input unit 311.

That is, the input button 363 may be disposed at a position corresponding to the command input unit 311 provided at the manipulation unit 310 such that the input button 363 is also pushed when the command input unit 311 is pushed.

In the laundry machine 200 according to the present invention, therefore, a single command input unit 311 is provided at the manipulation unit 310.

That is, a portion of the manipulation unit 310 that corresponds to the input button 363 as the result of rotation of the manipulation unit 310 may constitute a command input unit.

Consequently, the user may rotate the manipulation unit 310 and push the position of the manipulation unit 310 corresponding to the input button 363 to perform all kinds of manipulation related to the laundry machine 200.

For example, the manipulation of the laundry machine 200, including the input of power, the selection of a washing course, the change of an option, the start of the selected washing course, and the setting of a delay time, may be performed by rotating the manipulation unit 310 and inputting a command through the command input unit 311.

As previously described, the command input unit 311 may be provided at the front surface of the manipulation unit 310 at a position corresponding to the input button 363. That is, the front surface of the manipulation unit 310 at a position corresponding to the input button 363 may function as the command input unit 311.

The reason for this is that the user can easily recognize the constant position of the manipulation unit 310 as the command input unit 311, irrespective of the rotation of the manipulation unit 310, for user convenience (i.e. for the convenience of user manipulation).

Figure 5:
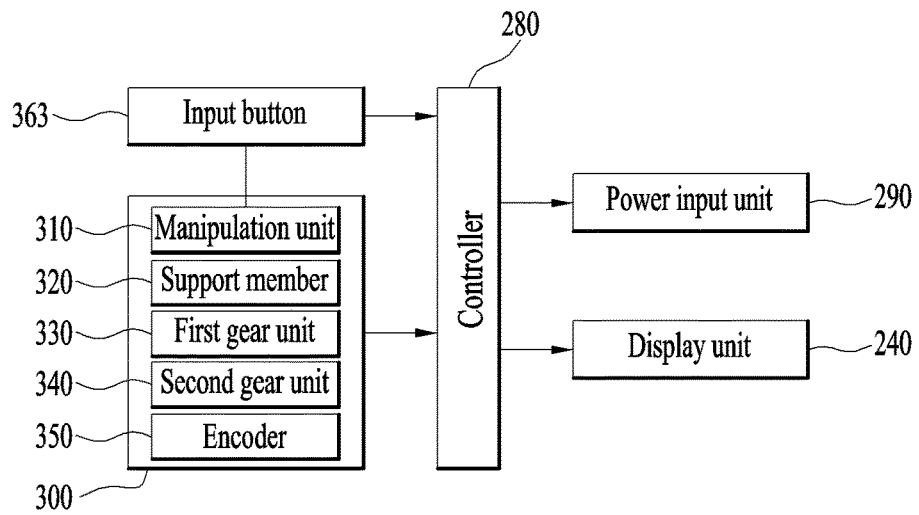
FIG. 5 is a block diagram showing the connection relationship between the manipulation mechanism, a controller, and the display unit.

In addition, the input button 363 may be connected to the controller (see FIG. 5). When the user pushes the command input unit 311, therefore, the input button 363 may also be pushed, whereby a command input through the command input unit 311 may be transmitted to the controller. In addition, the controller may control the display unit based on a command input through the command input unit 311.

Hereinafter, the principle by which the manipulation through the manipulation mechanism is transmitted to the display unit via the controller will be described with reference to FIG. 5.

FIG. 5 is a block diagram showing the connection relationship between the manipulation mechanism, the controller, and the display unit.

Referring to FIGS. 3 to 5, the laundry machine 200 may include a controller 280 and a power input unit 290.

The power input unit 290 may be configured to selectively supply power to the laundry machine 200. That is, the power input unit 290 may be configured to selectively supply power to the laundry machine 200 under the control of the controller 280.

The controller 280 may be electrically connected to the manipulation mechanism 300 and the input button 363.

That is, the controller 280 may be configured to receive a manipulation signal from the manipulation mechanism 300. In addition, the controller 280 may be configured to control the display unit 240 and the power input unit 290 based on the manipulation signal from the manipulation mechanism 300.

Specifically, when the manipulation unit 310 is rotated by the user, the rotational force of the manipulation unit 310 may be sequentially transmitted to the support member 320, the first gear unit 330, and the second gear unit 340, and may be finally transmitted to the encoder 350 connected to the second gear unit 340.

The encoder 350 may be configured to transmit a signal indicating the rotational angle of the manipulation unit 310 based on the rotation force transmitted from the manipulation unit 310 to the controller 280.

The controller 280 may control the display unit 240 such that a plurality of input items displayed on the display unit 240 is sequentially lit (or activated) based on the signal indicating the rotational angle of the manipulation unit 310 transmitted from the encoder 350.

In addition, when the command input unit 311 provided at the manipulation unit 310 is manipulated by the user, the input button 363 provided at the lower side of the command input unit 311 at a position corresponding to the command input unit 311 is operated.

That is, when the command input unit 311 provided at the manipulation unit 310 is pushed by the user, the input button 363 provided at the lower side of the command input unit 311 at a position corresponding to the command input unit 311 is also pushed.

A signal generated when the command input unit 311 is pushed (i.e. a signal generated when the input button 363 is pushed) may be transmitted to the controller 280.

The controller 280 may control the display unit 240 to selectively display information about or the description of the input of the washing course selected by the manipulation unit 310, the input of at least one option accompanying the washing course, and the execution of the selected washing course based on the signal generated when the command input unit 311 is pushed (i.e. the signal generated when the input button 363 is pushed).

In addition, when the manipulation unit 310 is rotated by a predetermined angle or more or when the signal input through the command input unit 311 is maintained for a predetermined time or more, the controller 280 may control the power input unit 290 such that power from an external power source is supplied to the laundry machine 200 via the power input unit.

That is, in order to supply power to the laundry machine 200, the user may rotate the manipulation unit 310 by a predetermined angle (e.g. 360 degrees) or more, or may push the command input unit 311 for a predetermined time (e.g. 2 to 3 seconds) or more.

When the signal input through the command input unit 311 is maintained for the predetermined time (e.g. 2 to 3 seconds) or more in the state in which the power is supplied to the laundry machine 200, the power input unit 290 may interrupt the supply of power from the external power source to the laundry machine 200.

That is, the controller 280 may determine whether the signal input through the command input unit 311 is maintained for the predetermined time or more in the state in which the power is supplied to the laundry machine 200. Upon determining that the input signal input is maintained for the predetermined time or more, the controller 280 may control the power input unit 290 such that the supply of power to the laundry machine 200 from the power input unit 290 or the external power source is interrupted.

As described above, the user may rotate the manipulation unit 310 or push the command input unit 311 to supply power to the laundry machine 200. In addition, the user may push the command input unit for the predetermined time or more to interrupt the supply of power to the laundry machine 200.

Hereinafter, a screen or an image realized on the display unit 240 will be described in detail with reference to other drawings.

Figure 6:
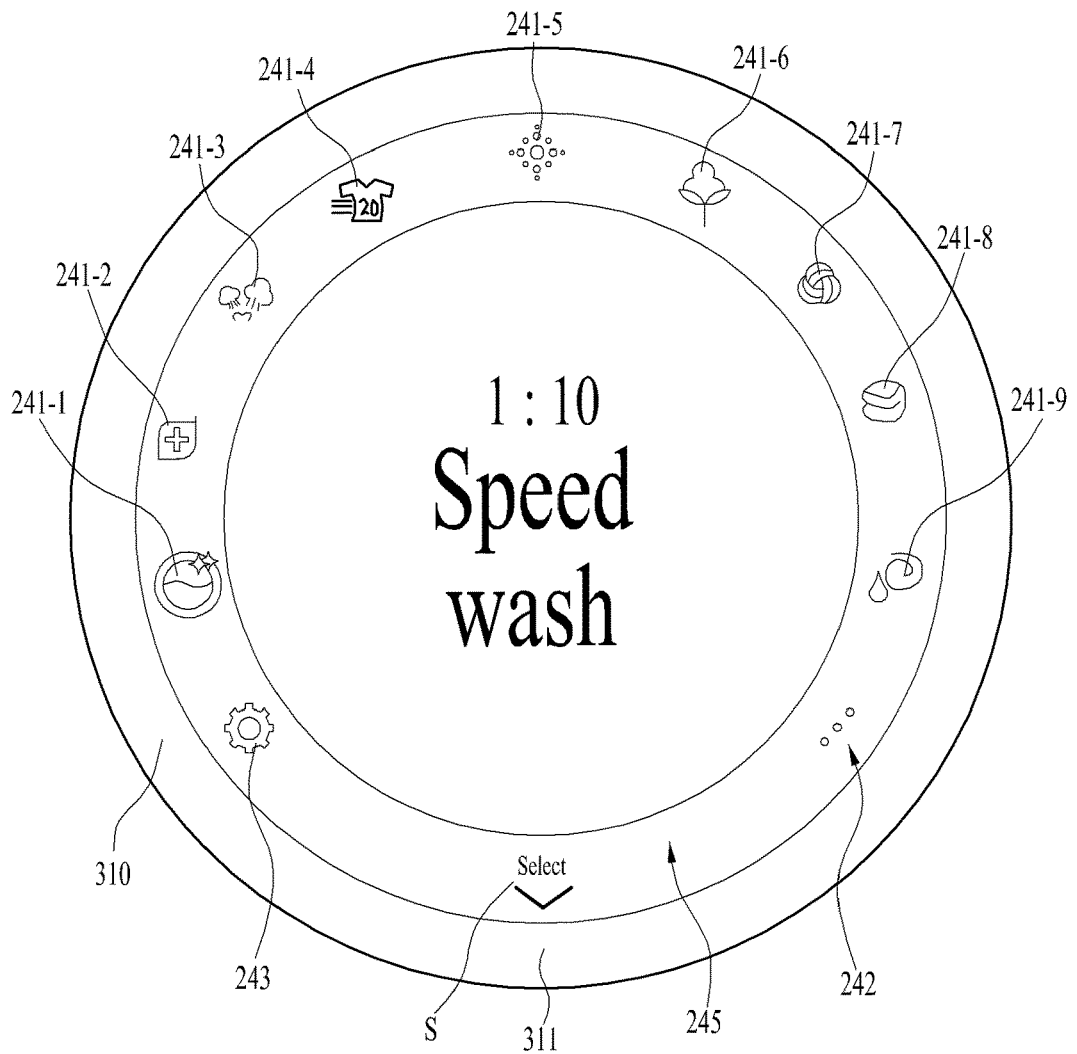
FIG. 6 is a view showing an example in which a course selection screen is displayed on the display unit.

FIG. 6 is a view showing an example in which a course selection screen is displayed on the display unit.

Referring to FIGS. 2 to 6, the display unit 240 may be provided with a circular display zone 245 corresponding to the circular ring-shaped manipulation unit 310. Specifically, the circular display zone 245 is disposed at a position corresponding, to the manipulation unit through-hole 312 formed in the manipulation unit 310.

Consequently, the user may visually recognize a screen or an image displayed in the circular display zone 245 through the manipulation unit through-hole 312.

Meanwhile, when power is supplied to the laundry machine 200, a course selection screen shown in FIG. 6 may be displayed in the display zone 245. That is, when power is supplied to the laundry machine 200, the controller 280 may control the display unit 240 such that a course selection screen is displayed in the display zone 245 of the display unit 240.

On the course selection screen, a plurality of washing course icons 241-1 to 241-9 and an additional course icon 242 may be displayed in the circumferential direction of the display zone 245.

The washing course icons 241-1 to 241-9 and the additional course icon 242 may be selectively lit (or activated) through the rotation of the manipulation unit 310.

In addition, on the course selection screen, the description of a selected course, including the name of the selected course, and the time required for the selected course may be displayed at the central part of the display zone 245 in the lateral direction thereof.

The washing course icons 241-1 to 241-9 may include one or more selected from among icons indicating normal washing, baby clothes, boiling, speed wash, allergy care, steam cleaning, functional clothes, bedding cleaning, cold water wash, lingerie/wool, bedclothes, and rinsing/spin drying.

The controller 280 may control the display unit 240 such that the washing course icons 241-1 to 241-9 and the additional course icon 242 displayed in the display zone 245 are sequentially lit in response to the rotation of the manipulation unit 310.

That is, when the user rotates the manipulation unit 310, the washing course icons 241-1 to 241-9 and the additional course icon 242 displayed in the display zone 245 may be sequentially lit or activated.

Meanwhile, a signal generated when the manipulation unit 310 is rotated may be transmitted to the controller 280 via the encoder 350, which has been described with reference to FIGS. 3 to 5. The controller 280 may control the display unit 240 based on the rotational angle of the manipulation unit 310 transmitted via the encoder 350.

In addition, a setting icon 243 for environment setting may be further displayed on the course selection screen at one side of the display zone 245 in the circumferential direction thereof.

The controller may control the display unit 240 such that the washing course icons 241-1 to 241-9, the additional course icon 242, and the setting icon 243 are sequentially lit or activated in response to the rotation of the manipulation unit 310.

In addition, a "select" word S may be displayed on the course selection screen. The "select" word S may be displayed so as to correspond to a portion of the manipulation unit 310 at which the command input unit 311 is located. That is, the "select" word S may be displayed on the course selection screen at a 6 o'clock position.

Consequently, the user may easily recognize that the command input unit 311 is located at a position of the manipulation unit 310 corresponding to a portion at which the "select" word S is displayed, and may push the command input unit 311 to complete the selection of a desired course.

Meanwhile, when the user inputs a signal through the command input unit 311 in the state in which the setting icon 243 is lit in response to the rotation of the manipulation unit 310, a setting screen (not shown) for setting the display unit 240 may be displayed.

Screen brightness, usable languages, and the like may be displayed on the setting screen such that the user can set the display unit 240 by manipulating the manipulation unit 310 and inputting a signal through the command input unit 311.

In addition, when the user inputs a signal through the command input unit 311 in the state in which the additional course icon 242 is lit in response to the rotation of the manipulation unit 310, a plurality of additional washing course icons (not shown), other than the washing course icons, may be displayed in the circumferential direction of the display zone 245.

The additional washing courses may be updated at predetermined intervals through a memory (not shown) provided in the controller 280.

Meanwhile, when one of the washing course icons 241-1 to 241-9 is selected in response to the rotation of the manipulation unit 310 and the selected course is input through the command input unit 311, an option setting screen may be displayed in the display zone 245.

For example, when the speed wash icon 241-3 is selected from among the washing course icons 241-1 to 241-9 in response to the rotation of the manipulation unit 310 and a signal is input through the command input unit 311, as shown in FIG. 5, an option setting screen for option setting may be displayed in the display zone 245.

Hereinafter, the option setting screen will be described in detail with reference to FIG. 7.

Figure 7:
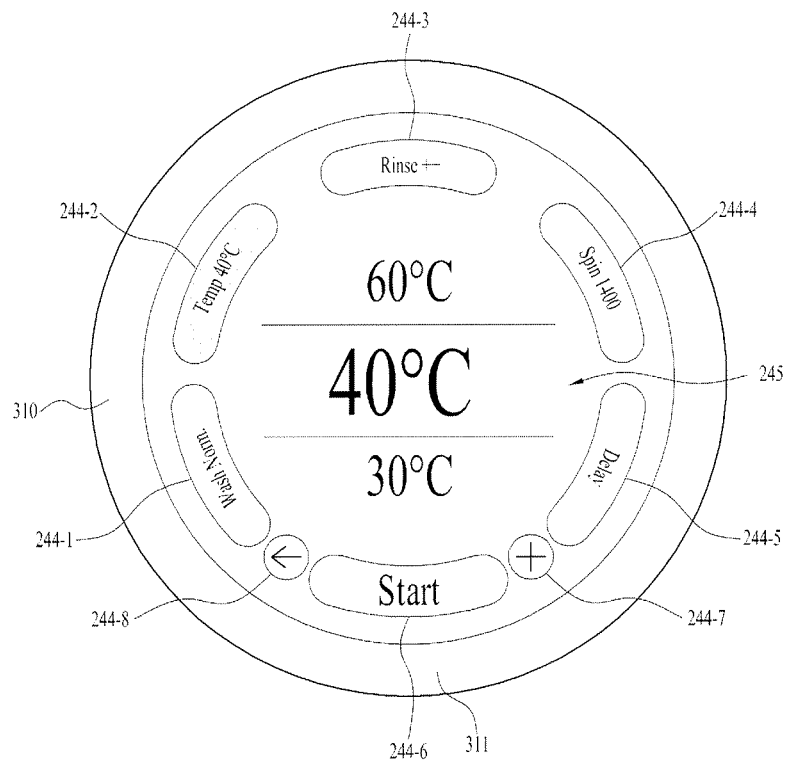
FIG. 7 is a view showing an example in which an option setting screen is displayed on the display unit.

FIG. 7 is a view showing an example in which the option setting screen is displayed on the display unit.

Referring to FIG. 7, one or more selected from among one or more predetermined option icons 244-1 to 244-4 accompanying a washing course selected by the user, a delay icon 244-5, and a start icon 244-6 may be displayed on the option setting screen in the circumferential direction of the display zone 245.

The option icons 244-1 to 244-4 may include one or more selected from among a washing intensity icon 244-1, a wash water temperature icon 244-2, a number-of-rinses icon 244-3, and a spin-drying intensity icon 244-4.

That is, the controller 280 may control the display unit 240 such that one or more selected from among the one or more option icons 244-1 to 244-4 accompanying the selected washing course, the delay icon 244-5, and the start icon 244-6 are displayed on the option setting screen in the circumferential direction of the display zone 245.

The controller 280 may control the display unit 240 such that the one or more option icons 244-1 to 244-4, the delay icon 244-5, and the start icon 244-6 are sequentially lit (or activated) in order of arrangement in response to the manipulation (i.e. the rotation) of the manipulation unit 310.

For example, the option icons 244-1 to 244-4 may be displayed in the display zone 245. The user may rotate the manipulation unit 310 to select one of the option icons 244-1 to 244-4. In addition, the user may change the setting of the selected option.

For example, as shown in FIG. 7, the user may rotate the manipulation unit 310 to light or activate the wash water temperature icon 244-2. When the user inputs a signal through the command input unit 311 in this state, the temperature of wash water may be changed.

That is, the command input unit 311 may be configured to change the value of the option selected in response to the rotation of the manipulation unit 310. Consequently, the user may push the command input unit 311 to change the value of the option selected by the manipulation unit 310.

Information about (or the setting value of) the temperature of the wash water may be displayed at the central part of the display zone 245 in the radial direction thereof.

That is, the user may rotate the manipulation unit 310 to light an option icon related to an option that is desired to be changed, and may push the command input unit 311 to change the value of the option that is desired to be changed.

In addition, an additional option icon 244-7 and a back icon 244-8 may be further displayed on the option setting screen.

The additional option icon 244-7 and the back icon 244-8 may be displayed in the circumferential direction of the display zone 245 together with the one or more option icons 244-1 to 244-4, the delay icon 244-5, and the start icon 244-6.

When a signal is input through the command input unit 311 in the state in which the additional option icon 244-7 is lit (or activated), the controller 280 may control the display unit 240 such that option icons other than the one or more predetermined option icons 244-1 to 244-4 are displayed in the display zone 245.

In addition, when a signal is input through the command input unit 311 in the state in which the back icon 244-8 is lit (or activated), the controller 280 may control the display unit 240 such that the course selection screen is displayed again in the display zone 245.

That is, when the back icon 244-8 is selected in response to the rotation of the manipulation unit 310 and a signal is input through the command input unit 311, the controller 280 may control the display unit 240 such that the course selection screen is displayed again in the display zone 245.

Meanwhile, when the user wishes to drive the laundry machine 200 based on a selected course and set options, the user may input a signal through the command input unit 311 in the state in which the start icon 244-6 is lit.

That is, the user may rotate the manipulation unit 310 to select (i.e. light) the start icon 244-6, and may push the command input unit 311 to drive the laundry machine 200 based on a selected course and set options.

The start icon 244-6 may be activated only on the option setting screen. That is, the start icon 244-6 may not be displayed on the course selection screen but may be displayed only on the option setting screen.

Consequently, the user may select a course on the course selection screen and may check the option setting screen to drive the laundry machine 200.

Hereinafter, an image or a screen displayed in the display zone 245 during the driving of the laundry machine 200 (i.e. during the execution of a cycle) will be described with reference to FIG. 8.

Figure 8:
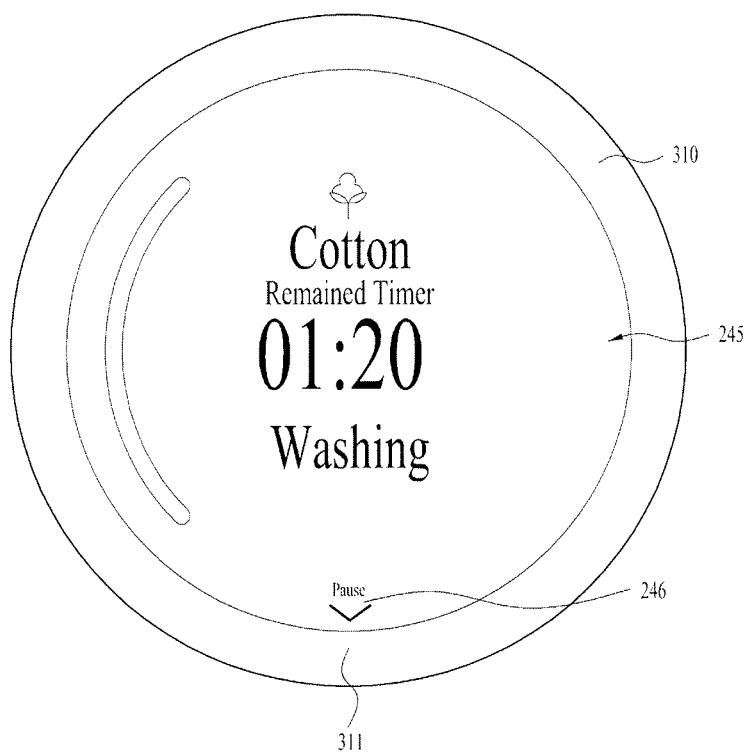
FIG. 8 is a view showing a cycle execution screen displayed on the display unit when a specific washing course is started.

FIG. 8 is a view showing a cycle execution screen displayed on the display unit when a specific washing course is started.

As described with reference to FIG. 7, the user may drive the laundry machine 200 after completing the selection of a desired washing course and the setting of options.

During the driving of the laundry machine 200, information about a washing course that is being executed and information about the time left until washing is completed may be displayed in the display zone 245.

That is, during the driving of the laundry machine 200, information about a washing course that is being performed and the time left until washing is completed may be displayed in the display zone 245 realized inside the manipulation unit 310 in the radial direction thereof. A cycle that is being performed (e.g. washing) may be further displayed in the display zone 245.

In addition, a word "pause" 246 may be displayed at one side of the display zone 245 in the circumferential direction thereof.

Specifically, the word "pause" 246 may be displayed in the display zone 245 at a position corresponding to the command input unit 311 provided at the manipulation unit 310.

That is, the word "pause" 246 may be displayed in the display zone 245 at a 6 o'clock position.

Consequently, the user may easily recognize that a portion of the manipulation unit 310 corresponding to the portion at which the word "pause" 246 is displayed constitutes the command input unit 311.

In addition, the user may push the command input unit 311 to temporarily stop the driving of the laundry machine 200 while the laundry machine 200 is being driven based on the selected washing course.

Hereinafter, a delay setting screen will be described with reference to FIGS. 9A and 9B.

Figure 9A:
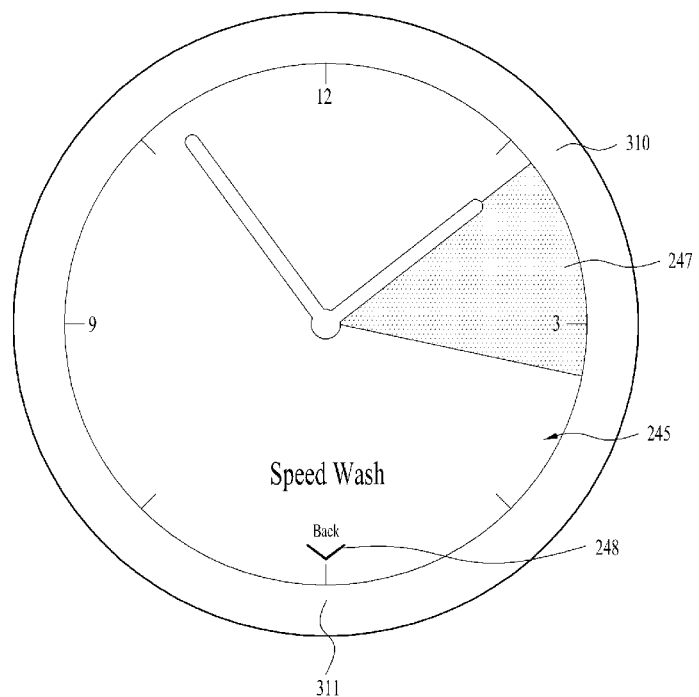
FIGS. 9A and 9B are views showing an example in which a delay setting screen is displayed on the display unit.
Figure 9B:
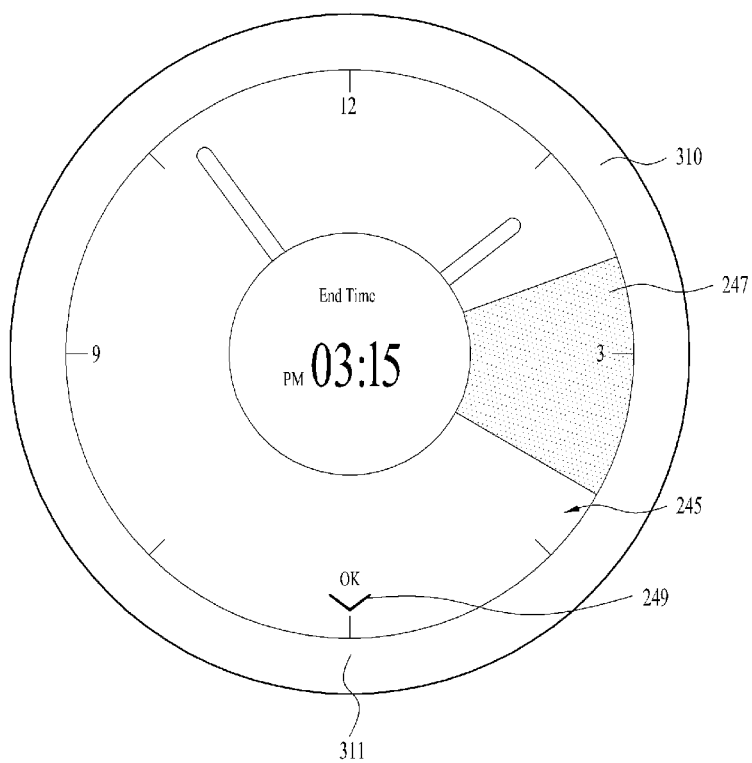

FIGS. 9A and 9B are views showing an example in which a delay setting screen is displayed on the display unit. Specifically, FIG. 9A shows an initial delay setting screen, and FIG. 9B shows a delay setting screen when the manipulation unit 310 is rotated by a predetermined angle.

Referring to FIG. 7 and FIGS. 9A and 9B, when a delay icon is selected on the option setting screen shown in FIG. 7 in response to the rotation of the manipulation unit 310 and a signal is input through the command input unit 311, a delay setting screen may be displayed in the display zone 245 (see FIG. 9A).

For example, a delay setting screen may be displayed in the display zone 245 in the form of an analog clock.

The controller 280 may control the display unit 240 such that a delay time is selected in response to the rotation of the manipulation unit 310 and delay setting is completed through the command input unit 311 (see FIG. 9B).

More specifically, as shown in FIG. 9A, an indication 247 of a time remaining from the current time until a washing completion time may be lit on the initial delay setting screen in the shape of a sector.

A time required for washing may also be displayed through the area of the sector-shaped indication 247 of the washing completion time.

A word "back" 248 may be displayed in the display zone 245 at a portion corresponding to the position of the command input unit 311, i.e. at a 6 o'clock position.

When the user does not wish a delay setting, therefore, the user may push the command input unit 311 in the state in which the manipulation unit 310 is not rotated such that the screen displayed in the display zone 245 returns to the previous screen (i.e. the option setting screen).

When the user wishes to input a delay setting, the user may rotate the manipulation unit 310. In response to the rotation of the manipulation unit 310, the sector-shaped indication 247 of the washing completion time may also be moved (i.e. rotated).

For example, as shown in FIG. 9B, the sector-shaped indication 247 of the washing completion time may also be rotated in the clockwise direction in response to the clockwise rotation of the manipulation unit 310.

In addition, when the user rotates the manipulation unit 310 on the delay setting screen, a word "OK" 249 may be displayed in the display zone 245 at a position corresponding to the position of the command input unit 311.

When the indication 247 of the washing completion time is located at a desired washing completion time, therefore, the user may push the command input unit 311 to complete the delay setting.

That is, when a signal is input through the command input unit 311 in the state in which the indication 247 of the washing completion time is located at a desired washing completion time, the controller 280 may control the laundry machine 200 such that the laundry machine 200 is driven at the set delay time.

Hereinafter, a user interface including a manipulation mechanism and a display unit according to another embodiment of the present invention will be described with reference to the other drawings.

Figure 10:
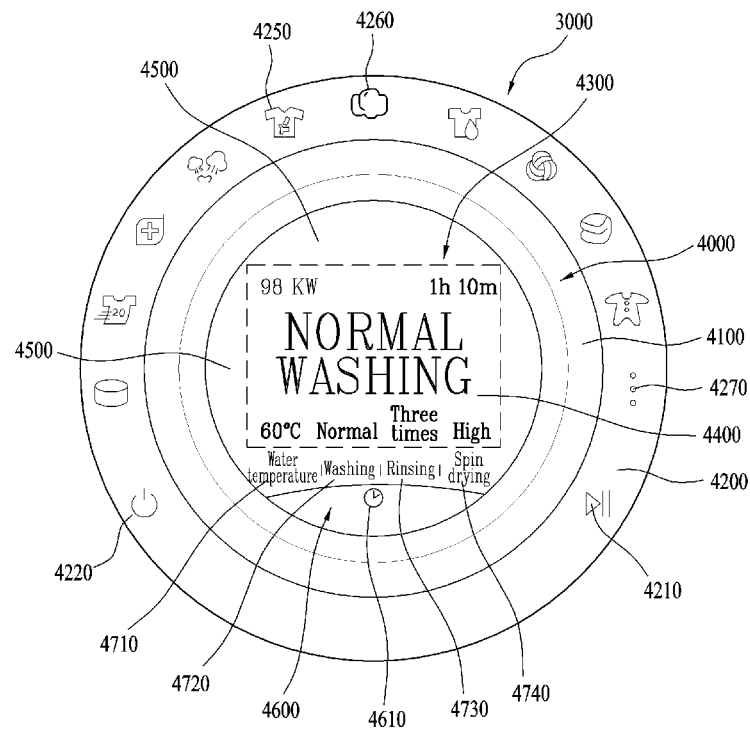
FIG. 10 is a front view showing an example of a user interface according to another embodiment of the present invention.

FIG. 10 is a front view showing an example of a user interface 3000 of a laundry machine according to another embodiment of the present invention.

The user interface 3000 may be provided at a control panel 2000 (see FIG. 15) of the laundry machine or a cabinet that defines the external appearance of the laundry machine. Of course, the control panel 2000 may be a portion of the cabinet that defines the external appearance of the laundry machine, or may be mounted at the cabinet.

According to this embodiment, as shown, it is possible to provide a user interface 3000 configured such that various complicated input units or selection units and a display, characteristics of the conventional art, are concentrated about a rotary knob 4100 and a laundry machine including the same. The rotary knob 4100 may be configured as a manipulation unit.

That is, according to this embodiment, it is possible to realize a user interface having a minimum number of input units disposed about the rotary knob 4100 without various input units and a display being spread out, unlike the conventional user interface shown in FIG. 1. In addition, it is possible to substantially include or easily add all conventional user interface functions through such a user interface.

The laundry machine according to this embodiment may include a display zone 4300 provided inside the rotary knob 4100 in the radial direction thereof. The display zone 4300 may include a display 4400. The display 4400 may be configured to display course information and option information.

The display 4400 may be realized by a liquid crystal display (LCD), a light emitting diode (LED) display, or an organic light emitting diode (OLED) display. Of course, the display 4400 may be realized by a touch display, such as a display of a smart phone.

In the case in which the display is realized by a touch display, however, production costs may be excessively increased due to the display. In addition, a high-performance processor may be required to constitute the controller, with the result that production costs may be excessively increased. Consequently, it is preferable to provide a liquid crystal display that is capable of displaying simple text and figures.

Specifically, the display 4400 may selectively display a course screen for a specific washing course selected by the rotary knob and an option screen for option changing. Of course, the display 4400 may display a guidance screen (not shown) or a course progress screen (not shown), in addition to the course screen and the option screen.

The laundry machine according to this embodiment may provide a plurality of washing courses. The user may select a specific course from among the washing courses based on the purpose of washing or the kind of laundry. FIG. 10 shows an example in which 10 washing courses are basically provided. The number of washing courses may be known from the number of icons 4250. In addition, as will be described later, at least one new washing course may be added using an additional icon 4270.

The user may select a specific course from among the washing courses using the rotary knob 4100. When the user rotates the rotary knob 4100 while holding the same, a course to be selected may be changed in a predetermined order. Course selection using the rotary knob 4100 is similar to what is shown in FIG. 1. Consequently, it is possible to minimize a burden or difficulty when a user who is accustomed to course selection through the rotary knob 4100 uses a new user interface.

When power is supplied to the laundry machine, an initial guidance screen may be displayed on the display 4400. For example, an initial guidance screen displaying a sentence "Select a washing course" may be displayed.

As the user rotates the rotary knob 4100 for course selection, a plurality of washing courses may be sequentially displayed on the display 4400. This screen may be referred to as a course screen. FIG. 10 shows a course screen that provides information about a "normal washing" course as an example of the course screen. When the user further rotates the rotary knob 4100 one pitch in the state in which the course screen for the normal washing course is displayed, a course screen for the next course may be displayed on the display. Basically, therefore, the course displayed on the course screen may be selected.

Various kinds of information about a selected specific course as well as a course name may be displayed on the course screen. For example, as shown in FIG. 10, information about power consumption, a course execution time, and the cycles in the course may be displayed.

The user may intuitively recognize information about the selected course through the display 4400 provided inside the rotary knob 4100. That is, the user may easily recognize information about the selected course without moving or scanning with his/her eyes.

Meanwhile, the languages displayed on the display may be variously changed. That is, languages may be easily changed via software. In particular, the course name, which is set based on the respective languages, may be easily set without changing hardware even when the language is changed.

For the control panel shown in FIG. 1, course names are printed on the front surface of the control panel. A laundry machine that is manufactured by a laundry machine manufacturer may be sold in various countries using various languages, as well as domestically. In this case, the hardware must be changed depending on the language. In the case in which the display is provided inside the rotary knob 4100 in the radial direction thereof or is provided so as to be surrounded by the rotary knob 4100, however, the course names may be easily set via software even when the language is changed. This means that it is not necessary to manufacture multiple different control panels for respective languages.

In general, a washing course may include a washing cycle, a rinsing cycle, and a spin-drying cycle. Of course, at least one cycle may be omitted depending on the course. The execution time, the number of times of execution, and the drum driving pattern of each cycle may be set differently depending on the course.

In addition, each washing course has basic set values. For example, the normal washing course shown in FIG. 10 has a wash water temperature of 60° C., normal washing intensity, three rinses, and fast spin drying as the basic set values. The basic set values may be differently set and changed for each course. Of course, such a change may be limited in a specific course.

After the selection of a specific course from among the washing courses, the user may select a start/pause input unit 4210. This form is the most basic use form of the laundry machine. That is, when start is input, the laundry machine starts to be driven according to the selected specific course, sequentially performs predetermined cycles, and completes the course.

As previously described, various options may be selected in the washing course. That is, various options that are capable of changing a predetermined value or condition may be selected. The options may be selected on the premise that the specific washing course is selected.

The options may include at least one selected from among changing the conditions of the respective cycles included in the course, performing an additional cycle, and changing the execution completion time of the course (i.e. delay setting).

In general, the options may be provided to change the temperature of wash water, washing intensity, the number of rinses, and spin-drying intensity. The options may be changed by selecting one from among a plurality of values. The four options may be basic options.

For example, the "spin-drying intensity" option may be provided to select one from among high, intermediate, and low. Of course, the RPM of the drum may be changed to select one from among them. The "number of rinses" option may be provided to select one from among five values ranging from no rinses to 4 rinses.

The options may include a delay option. The delay option may be an option for delaying the time at which the course is finished. For example, in the case in which a two-hour specific course is selected, the time at which the course is finished may be set to 4 hours after the current time. In this case, the laundry machine may have a two-hour waiting time, may perform the selected course for the remaining two hours, and may finish the course. The delay option is very useful when leaving home for a long time. That is, washing may be set to be finished upon returning home. Consequently, it is possible to prevent laundry that is being washed or laundry that has been washed from remaining in the laundry machine for a long time.

In this embodiment, it is possible to provide a laundry machine having a single variable input unit 4600 for providing an intuitive and minimal user interface.

The single variable input unit 4600 may be configured to select one from between a plurality of pieces of input information 4610 and 4620 depending on when it is selected. That is, one input unit may be configured to perform a plurality of functions. The single variable input unit 4600 may be configured to be selected by the user irrespective of the rotary knob 4100. The single variable input unit 4600 may be constituted by a button that is selected by a user's touch or push.

Specifically, the single variable input unit 4600 may be configured to have a plurality of pieces of input information 4610 and 4620 and to selectively display the input information. That is, what the selection of the single variable input unit 4600 at the current time means may be visually displayed.

FIG. 10 shows an example in which a clock-shaped icon 4610 is displayed in the single variable input unit 4600. It can be seen through the clock-shaped icon that input information is related to time, more particularly to delay. Consequently, the user may intuitively recognize input information as a delay time through the clock-shaped icon 4610.

In an example, the user may select the single variable input unit 4600 on the course screen for the "normal washing" shown in FIG. 10. This means that the user's intention to delay the time at which the normal washing course is performed and finished is directly reflected.

When the input unit 4600 in which input information as a delay time (i.e. the clock-shaped icon) is displayed is selected, the display 4400 switches from the course screen to the option screen. That is, the option screen for option changing is displayed. At this time, the single variable input unit 4600 is provided for delay entry. The display may be configured to selectively display the course screen and the option screen.

Figure 11:
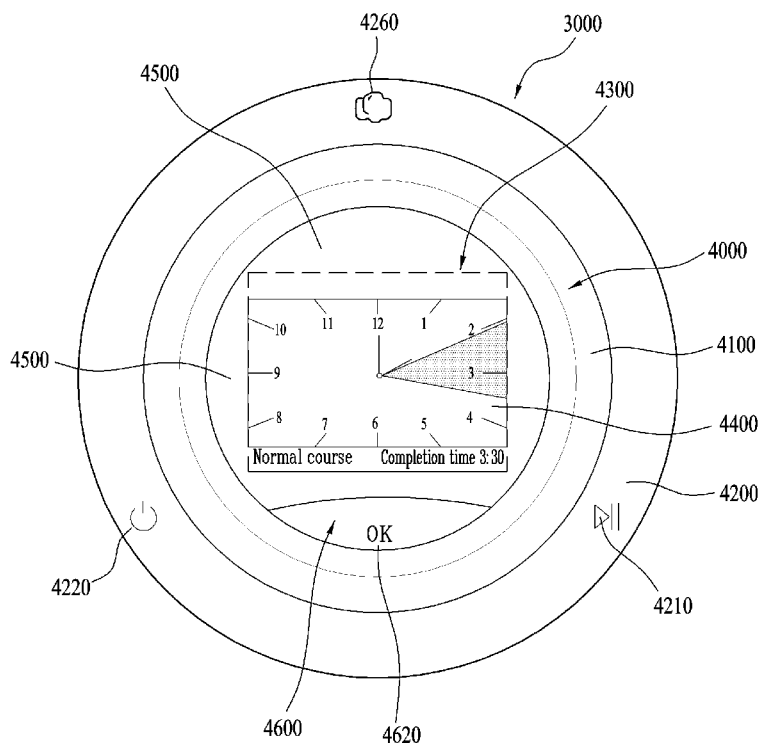
FIG. 11 is a front view showing an example in which a delay option screen is displayed on the user interface of FIG. 10.

FIG. 11 shows an example of an "option screen" for delay option changing. That is, when the single variable input unit 4600 for displaying delay information is selected on the course screen, the display displays an option screen for delay setting shown in FIG. 11. That is, a delay option screen for delay time changing is displayed. At this time, a clock form may be displayed, and the current time may be displayed. In addition, a predetermined course name and completion time may be displayed. The completion time may indicate the number of hours after the current time that washing will be finished. On the premise that the screen is switched from FIG. 10 to FIG. 11, it means that the normal course will be started 2 hours and 20 minutes after the current time. In addition, it means that the normal course will be performed for 1 hour and 10 minutes and will be finished 3 hours and 30 minutes after the current time.

Such a delay change may be performed by rotating the rotary knob 4100. That is, on the option screen, particularly on the option screen for delay changing, not on the course screen, the rotary knob 4100 may be a means for changing delay time. For example, as the rotary knob 4100 is rotated clockwise by one pitch, the delay time may be increased by 10 minutes or 30 minutes. The delay time may be decreased by 10 minutes or 30 minutes when the rotary knob 4100 is rotated counterclockwise by one pitch. Of course, the delay time setting range and unit may be preset.

In an example, the user may set the delay time through the rotary knob 4100 and may then perform input indicating that the delay setting has been completed through the single variable input unit 4600. That is, an indication that the delay setting has been completed may be input through the single variable input unit 4600. At this time, the single variable input unit 4600 may be provided to complete, for example, delay option setting.

When the single variable input unit 4600 is selected to complete the delay option setting, the display switches again from the option screen to the course screen. Of course, the time information shown in FIG. 10 may be changed from 1 hour and 10 minutes to 3 hours and 30 minutes.

Consequently, the single variable input unit 4600 may be provided to selectively perform option entry for option changing and option setting completion after option changing. That is, according to circumstances, a plurality of inputs or functions may be selected through the input unit 4600. As a result, it is possible to prevent an increase in the number of input units. The course selection time and the option selection time after course selection may be distinguished from each other in order to guide the user to perform necessary input. In addition, since the meaning of the selection of the single variable input unit is visually displayed depending on the time, it is possible to prevent mistakes and confusion on the part of the user. Since such input information is displayed in the single variable input unit 4600, it is possible for the user to more intuitively recognize what the selection of the input unit 4600 means.

Meanwhile, the distinction between the course selection time and the option selection time after course selection may be identical to the distinction between the course screen display time and the option screen display time on the display, as previously described.

For example, a clock icon 4610 may be displayed on the course screen, and the "OK" icon 4620 may be displayed on the option screen. The controller may perform control such that the screens displayed on the display are distinguished from each other, whereby the input information displayed in the single variable input unit 4600 is changed.

That is, the controller may perform control such that input information corresponding to each course screen is displayed in the single variable input unit. In addition, when the single variable input unit 4600 is selected, the controller may determine that the input information displayed in the single variable input unit has been input. In an example, when the single variable input unit 4600 is input in the state in which delay option entry information is displayed, the controller may control the display to display an option screen for delay option changing. When the single variable input unit 4600 is input in the state in which setting completion information is displayed, the controller may control the display to display a course screen. Of course, the course screen may be a course screen in which the changed option has been reflected.

As shown in FIGS. 10 and 11, the two icons 4610 and 4620 may be disposed up and down in the single variable input unit 4600. Of course, the two icons may be disposed side by side. In addition, the two icons may be selectively displayed.

Such a plurality of pieces of input information may be selectively displayed through the control of a light source. For example, the pieces of input information may be selectively displayed through control of the brightness of an LED, a description of which will follow.

Meanwhile, the single variable input unit 4600 may be provided inside the rotary knob 4100 in the radial direction thereof. That is, the display zone 4300 may include the single variable input unit 4600 as well as the display 4400. Consequently, the movement of the user's eyes may be minimized, and intuitive input may be possible.

As previously described, the options may include basic options as well as the delay option. In other words, the basic options may be changed in a specific washing course. Option selection units 4710 to 4740 may be provided to change the basic options. Four basic option selection units are shown in FIG. 10. The number of basic options may be changed. The option selection units 4710 to 4740 may be realized by buttons that are identical or similar to the single variable input unit 4600, a description of which will follow.

Figure 12:
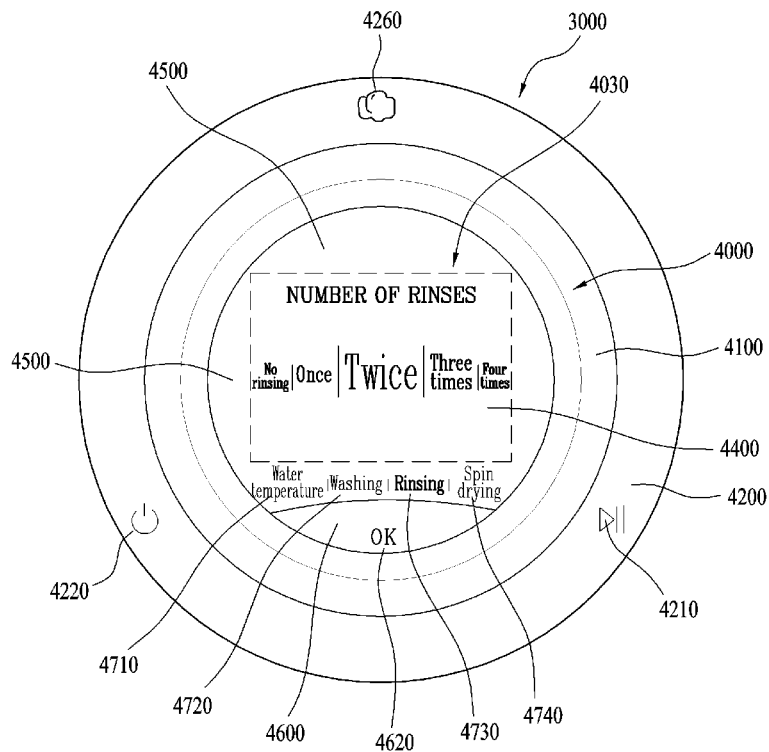
FIG. 12 is a front view showing an example in which a rinsing option screen is displayed on the user interface of FIG. 10.

On the course screen shown in FIG. 10, for example, the user may select an option selection unit 4730 corresponding to a rinsing option in order to change the rinsing option. The option selection unit 4730 may be selected by the user pushing or touching the option selection unit 4730. When the rinsing option selection unit 4730 is selected, an option screen for rinsing option changing may be displayed on the display 4400. That is, when the rinsing option selection unit 4730 is input, the controller may control the display 4400 to display an option screen corresponding thereto. FIG. 12 shows an example of an option screen for rinsing option changing.

The user may select a desired rinsing option on the screen shown in FIG. 12. That is, the user may select a number of rinses that is different from a predetermined number of rinses. In an example, the number of rinses may be set to two instead of three, which is a basic set value.

The number of rinses may be changed through the rotary knob 4100. As the rotary knob 4100 is rotated, the number of rinses may be sequentially changed. For example, when the user wishes to change the number of rinses from three to two, the user may counterclockwise rotate the rotary knob 4100 by one pitch.

In addition, the number of rinses may be changed by pushing the rinsing option selection unit 4730. Whenever the user pushes the rinsing option selection unit 4730, the number of rinses may be sequentially changed.

After changing the number of rinses, the user may input the single variable input unit 4600 on the screen shown in FIG. 12. That is, the selection of a specific number of rinses may be completed by inputting the single variable input unit 4600. At this time, the single variable input unit 4600 may display "OK" information in the same manner as in the completion of delay option setting described above. That is, "OK" information indicating the completion of rinsing option setting may be displayed.

On the option screen for option changing, therefore, input information indicating the completion of option setting may be displayed by the single variable input unit. This applies equally to other options, such as the temperature of wash water, the washing intensity, and the spin-drying intensity.

FIG. 12 shows an option screen for rinsing option changing. Consequently, the rinsing option selection unit 4730 may be more brightly displayed than other option selection units 4710, 4720, and 4740. Of course, the options may not be selected on the delay setting screen shown in FIG. 10. Consequently, the selection units 4710 to 4740 may not be displayed on the delay setting screen.

Meanwhile, as previously described, the washing course and the options may be selected in the display zone 4300 through the rotary knob 4100. That is, the user's hands and eyes do not need to travel over the user interface but may be concentrated on a specific zone, whereby the convenience in use of the user interface is improved.

That is, since the screen is immediately changed due to the manipulation of the rotary knob 4100 and the display inside the rotary knob in response thereto, the user interface may be very easily manipulated. In addition, the selection and changing of the options and the completion of the option setting are performed in the display zone inside the rotary knob 4100. As a result, the user interface may be very easily manipulated.

Meanwhile, the course display unit 121 is provided outside the rotary knob 110 shown in FIG. 1. As the rotary knob 110 is rotated, therefore, the position of a lit course display unit is changed. In this embodiment, a circular decoration unit 4200 that is similar to such a user interface and icons 4250 located in the decoration unit 4200 may be provided for the convenience of users who are familiar with the user interface. A plurality of icons 4250 may be provided so as to correspond to courses that are basically provided.

The icons 4250 may be formed in the shape of a diagram or a figure in order to intuitively indicate respective washing courses. Since the icons 4250 are not languages, the icons may not be affected even when the languages are changed. That is, since the laundry machine is not bound to specific languages used in places where the laundry machine is sold, the laundry machine may be configured to have a minimal design.

The icons 4250 may be auxiliary means for easy course selection. In this embodiment, the icons 4250 may be provided to visually display information about the selected specific washing course to the user during option changing.

Meanwhile, the decoration unit 4200 may include an additional icon 4270 as well as icons indicating the respective washing courses. The additional icon 4270 may correspond to a washing course other than the washing courses that are basically provided in the laundry machine.

As the material for clothes is diversified and the frequency in use of functional clothes is increased, it is necessary to provide a new washing course. In this case, such a new washing course may be added to the laundry machine. However, it is not easy to change the conventional user interface.

In the case in which the new washing course is added, such information may not be easily exposed to the user. For this reason, the addition of the new washing course may not be attempted.

In the embodiment of the present invention, the user may easily recognize and use an added washing course through an additional icon that is not based on text in order to solve the above problem.

In addition, a washing course that is rarely used may be included in the conventional washing courses. It is not necessary for a washing course that is rarely used to be visible to the user. However, it may not be desirable to remove a washing course that is rarely used. Consequently, it is possible to make a washing course that is rarely used correspond to the additional icon 4270. As a result, it is possible to prevent the reduction of recognition due to the excessive increase in the number of icons 4250.

In other words, the additional icon 4270 may correspond to a washing course that is newly added in addition to the basic washing courses and/or a washing course that is rarely used in addition to washing courses that are frequently used.

For example, as the user rotates the rotary knob 4100, the basic icons are sequentially displayed more brightly. When the user further rotates the rotary knob 4100, the additional icon is displayed more brightly. At this time, a course corresponding to the additional icon is displayed on the display 4400.

In the case in which the number of new courses is 3, the additional icon may remain displayed more brightly until the rotary knob 4100 is rotated two pitches. Of course, when the rotary knob 4100 is rotated one pitch, a corresponding new course is displayed on the display.

Figure 13:
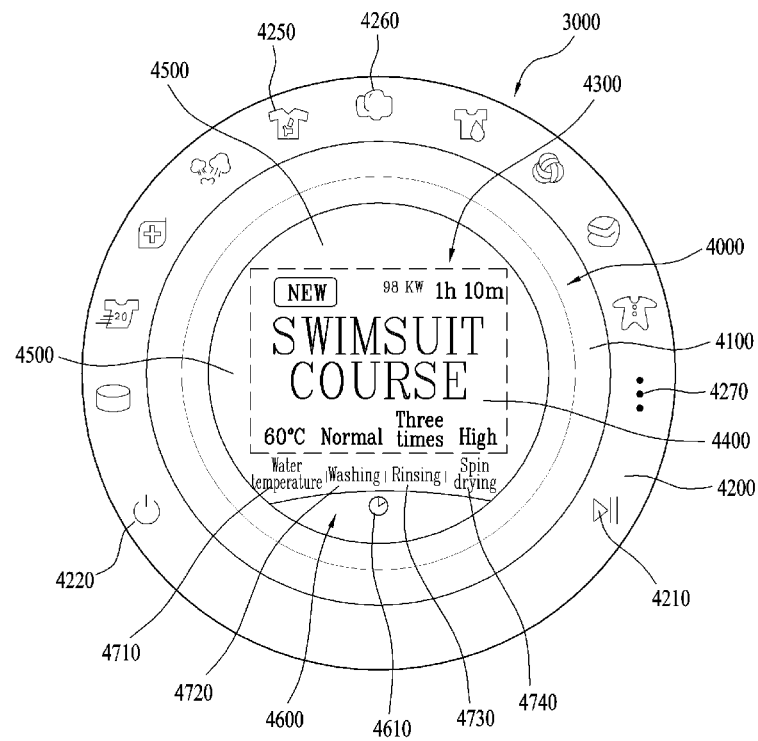
FIG. 13 is a front view showing an example in which an additional course screen is displayed on the user interface of FIG. 10.

FIG. 13 shows a swimsuit course as an example of an added new course. Consequently, the user may easily use the added new course through the additional icon. This may mean that it is not necessary to change the hardware for the user interface. Consequently, the new course may be easily added, selected, and used while the conventional course selection method is not changed.

Meanwhile, the swimsuit course may be a basic course. The swimsuit course may be rarely used. Consequently, such a course that is rarely used may be configured to correspond to the additional icon 4270. As a result, it is possible to prevent the washing course that is rarely used from being constantly exposed to the user.

Figure 14:
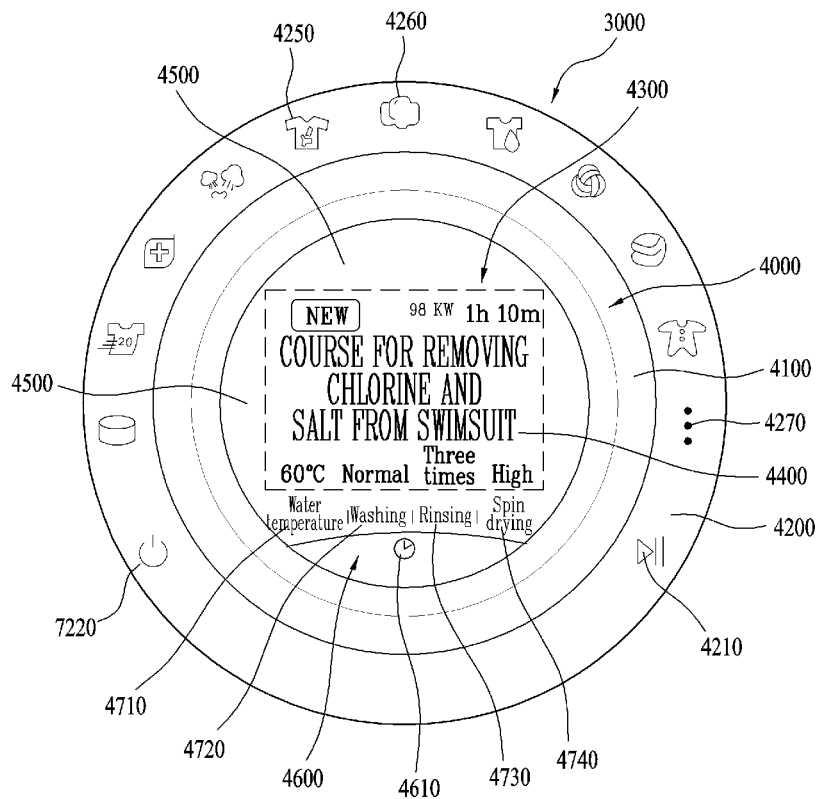
FIG. 14 is a front view showing another example in which an additional course screen is displayed on the user interface of FIG. 10.

FIG. 14 also shows a swimsuit course as an example of an added new course. In this case, a word that describes the course may be displayed instead of a course name, unlike what is shown in FIG. 13. Of course, the screens shown in FIGS. 13 and 14 may be alternately displayed. Meanwhile, in the case in which a course is added, the added course may be clearly displayed on the display 4400. FIGS. 13 and 14 show an example in which the added course is clearly displayed through a word "NEW".

As previously described, the icons 4250 provided in the decoration unit 4200 may be additional means for easy course selection. Consequently, an icon corresponding to a selected washing course may be visually different from other icons.

FIG. 10 shows an example in which an icon corresponding to the "normal washing" course is displayed more brightly than other icons.

When power is supplied to the laundry machine, a washing course is generally selected first. When power is supplied to the laundry machine, therefore, all icons corresponding to a plurality of washing courses may be displayed at the same brightness. As the rotary knob 4100 is rotated, only an icon corresponding to a selected washing course may be displayed at higher brightness.

Consequently, the brightness of the additional icon 4270 as well as the icons 4250 may be controlled so as to have a plurality of levels, such as the minimum level (or the OFF state), the intermediate level, and the maximum level.

In the state in which no power is supplied or in the state in which no washing course can be selected, the brightness may have the minimum level. In the state in which a washing course can be selected, the brightness may have the intermediate level. In the state in which a washing course has been selected, the brightness may have the maximum level.

In FIG. 10, since the normal washing course has been selected, the icon indicating the normal washing course may have the maximum level of brightness, and the other icons may have the intermediate level of brightness. That is, the washing course may be changed in this state. Consequently, it is possible to intuitively recognize the current state based on the difference in brightness level among the icons.

FIGS. 11 and 12 respectively show examples in which delay option changing and rinsing option changing are performed on the premise that the normal washing course is selected. Since such Option changing is performed on the premise that the normal washing course is selected, course changing is not possible at this time. Consequently, the icon indicating the normal washing course is displayed at the maximum level of brightness, and the other icons are displayed at the minimum level of brightness. Consequently, the user may clearly recognize the sequence of the course selection and option selection.

The icons 4250 and 4280 may be realized through a light transmission unit 4260. In the same manner, input information of the single variable input unit may be realized through the light transmission unit.

As shown in FIG. 10, a power input unit 4220 and a start/pause input unit 4210 may be provided in the decoration unit 4200. The input units 4210 and 4220 may be configured in the form of a button. The position of the input units 4210 and 4220 substantially means that the user interface 3000 is concentrated at the rotary knob 4100. Icons indicating the input units 4210 and 4220 may be realized through the light transmission unit.

Meanwhile, the display zone 4300 may include the display 4400, the option selection units 4710 to 4740, and the single variable input unit 4600. That is, the display zone 4300 may be partitioned into a plurality of parts.

Consequently, the circular zone inside the rotary knob 4100 in the radial direction thereof may be partitioned into the display 4400, the option selection units 4710 to 4740, and the single variable input unit 4600. In addition, in the case in which a quadrangular display is used, the display zone 4300 may further include a dummy zone 4500.

The display zone 4300 may have a background screen having the same color. For example, the display zone may have a black background screen. That is, all of the zone inside the rotary knob 4100 in the radial direction thereof may be realized as a single black display. Of course, in practice, only a portion thereof may be a display. Consequently, it is possible to realize satisfaction in use and design as if a touch display were being used, but without the provision of a high-priced touch display.

The black display effect may be further prominent through the light transmission units. The reason for this is that no light is transmitted through the light transmission units in the state in which no power is supplied. That is, all icons shown in FIG. 10 may seem to disappear. That is, no light is transmitted through the light transmission unit corresponding to the option selection units 4710 to 4740 and through the light transmission unit corresponding to the single variable input unit 4600. The display 4400 is also turned off. Consequently, the display zone may seem to be a black display. In addition, no light is transmitted through the light transmission unit 4260 corresponding to the washing course icons 4250 and 4270. As a result, it is possible to realize a minimal design having no text or language printed on the front surface of the control panel.

Hereinafter, an example of the structure of the user interface 3000 will be described in detail with reference to FIGS. 15 and 16.

Figure 15:
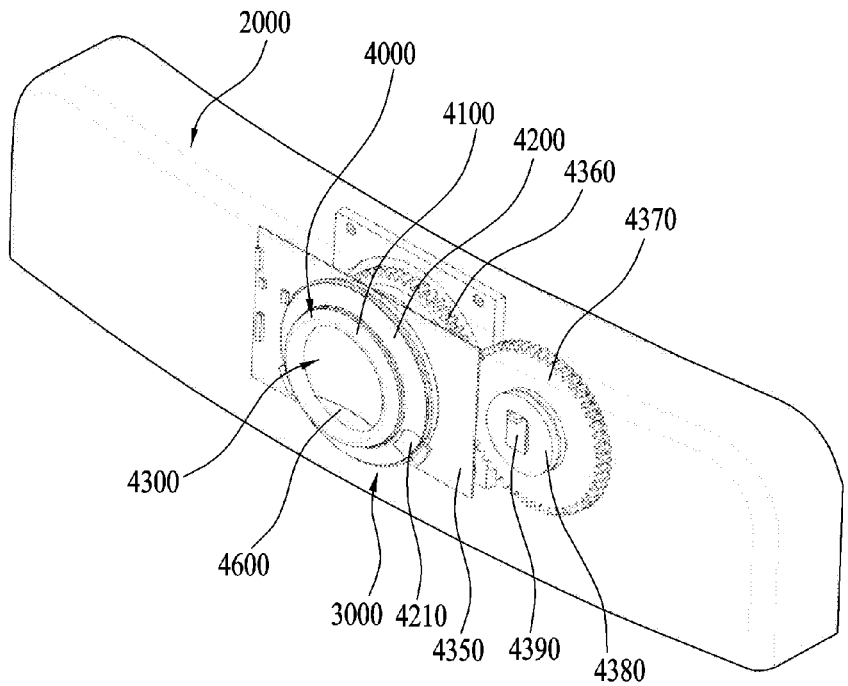
FIG. 15 is a perspective view showing the relationship between the user interface of FIG. 10 and a control panel.

FIG. 15 shows the relationship between a control panel 2000 and the user interface 3000. The rotary knob 4100 and the decoration unit 4200 may be exposed at the front surface of the control panel 2000, and the other components may be located inside the control panel 2000. In addition, the display zone 4300 may be exposed at the front surface of the control panel 2000 such that the user can access the display zone.

The rotary knob 4100 is configured to be rotatable, and the display zone 4300 provided inside the rotary knob 4100 in the radial direction thereof is not rotated.

The rotation of the rotary knob 4100 is transmitted to a display mounting unit 4360, and the rotation of the display mounting unit 4360 is transmitted to an encoder mounting unit 4370. When the encoder mounting unit 4370 is rotated, an encoder 4390 is rotated. A signal indicating the rotation of the encoder 4390 is transmitted to a controller 4350. The controller may be realized through a controller mounted in a printed circuit board (PCB).

The display 4400 may be located inside the display mounting unit 4360 in the radial direction thereof. The display 4400 may be fixed so as not to be rotated even when the display mounting unit 4360 is rotated. That is, the rotary knob 4100 and the display mounting unit 4360 may be configured to be rotatable relative to the display zone 4300. For this reason, it is difficult to locate the encoder 4390 at the rear of the rotary knob 4100. Consequently, the encoder mounting unit 4370 may be located outside the display mounting unit 4360 in the radial direction thereof in order to transmit the rotation of the rotary knob 4100 to the encoder 4390.

The display mounting unit 4360 and the encoder mounting unit 4370 may be engaged with each other in a gear engagement fashion in order to achieve the transmission of rotation.

Figure 16:
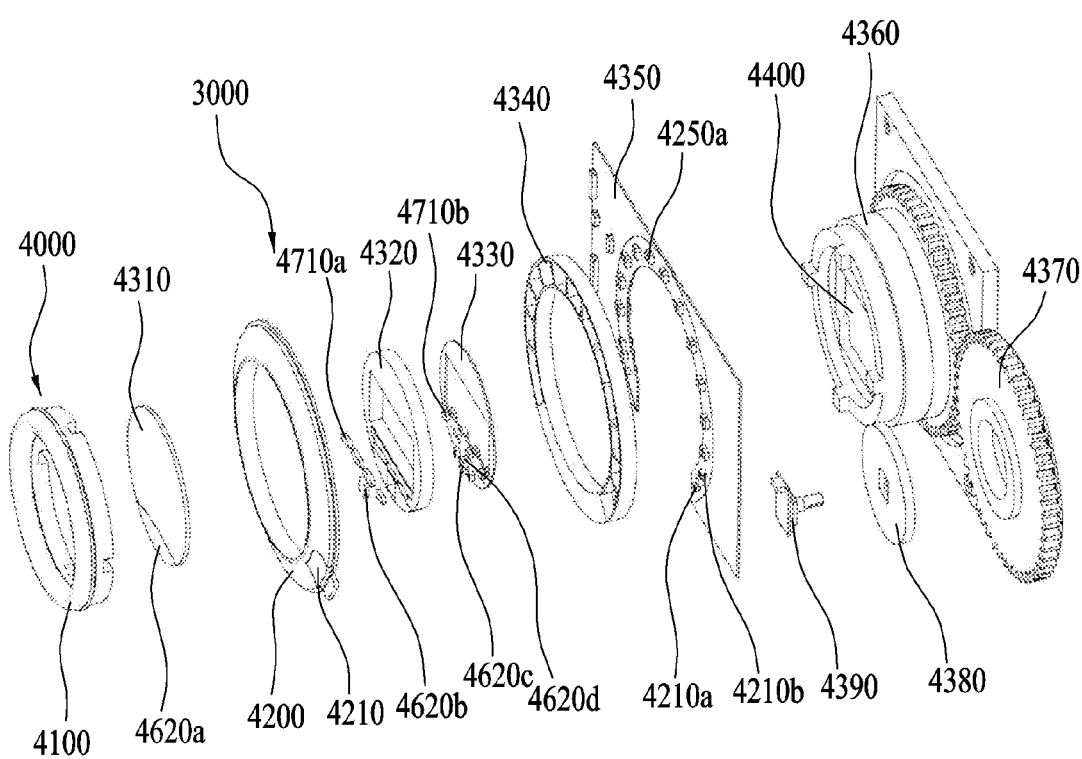
FIG. 16 is an exploded perspective view showing the user interface of FIG. 15.

FIG. 16 is an exploded perspective view of the user interface 3000 shown in FIG. 15.

A portion of the rotary knob 4100 may be inserted into the inside of the decoration unit 4200 in the radial direction thereof so as to be matched with the display mounting unit 4360. A window 4310 and a single touch unit 4620*a* are located at the front surface of the display zone 4300.

An input unit housing 4320 and an LED PCB 4330 may be located at the rear of the window 4310 and the single touch unit 4620*a*.

Four touch sensing units 4710*a* corresponding to the option input units 4710 to 4740 and a tact switch 4620*b* corresponding to the single touch unit 4620*a* may be mounted in the input unit housing 4320.

The LED PCB 4330 may be provided with a plurality of LEDs 4710*b* as light sources corresponding to the option input units 4710 to 4740 and a plurality of LEDs 4620*c* and 4620*d* corresponding to the single touch unit 4620*a*.

Four LEDs 4710*b* may be provided so as to correspond to four basic options. The brightness of the LEDs 4710*b* may be differently controlled. In the same manner, the brightness of the LEDs 4620*c* and 4620*d* may be differently controlled so as to selectively display input information from the single variable input unit 4600.

A main PCB constituting the controller 4350 may be provided at the rear of the decoration unit 4200. The main PCB may be provided with a plurality of LEDs 4250*a* corresponding to the respective washing courses. An LED support 4340 may be located between the LEDs 4250*a* and the decoration unit 4200.

Meanwhile, light transmission units are formed in the window 4310, the single touch unit 4620*a* of the single variable input unit, and the decoration unit 4200. The light transmission units may be icons. That is, light may be substantially transmitted only through the icons. Consequently, the brightness of light that is transmitted through the icons may be differently controlled so as to visually display the current state.

The light transmission units may correspond to the respective light sources. Of course, the light sources may be LEDs. The controller 4350 may selectively control the brightness of the light sources. The brightness of the light sources may have three levels, as previously described. In addition, the brightness of the light sources may be controlled through on/off control of the LEDs or control of a duty ratio.

The light sources, particularly the LEDs, are controlled so as to timely show information displayed through the light transmission units. That is, in the state in which selection or input is necessary or enabled, light is transmitted through the light transmission units so as to show that selection or input is enabled. In addition, which selection or input is possible may be shown based on the shape of the icons indicating the light transmission units. On the other hand, in the state in which selection or input is unnecessary or disabled, no light is transmitted. Consequently, it is possible to prevent mistakes and confusion on the part of the user due to the exposure of such information.

Particularly, in this embodiment, since a single input unit selectively shows which input is possible depending on the current state, the number of input units may be reduced, user convenience may be improved, and mistakes and confusion on the part of the user may be effectively prevented.

Although the preferred embodiments of the present invention have been described in detail above, it will be apparent to those skilled in the art that various modifications can be made in the present invention without departing from the spirit and scope of the present invention defined in the appended claims. Thus, it is intended that changes to future embodiments of the present invention do not depart from the technology of the present invention.

INDUSTRIAL APPLICABILITY

Described in the specification.

The invention claimed is:

1. A laundry machine that provides a plurality of washing courses, and when a specific washing course is selected from among the washing courses, is capable of changing at least one option accompanying the specific washing course, the laundry machine comprising:
a rotatable manipulation unit configured to select a specific washing course and to select at least one option accompanying the specific washing course;
a display unit configured to selectively display input items, comprising one or more selected from among washing course icons indicating the washing courses, an option icon indicating at least one option accompanying each of the washing courses, and a start icon, inside the manipulation unit in a radial direction thereof;
a command input unit provided at a front surface of the manipulation unit for inputting a washing course selected by the manipulation unit, changing the at least one option, and inputting a signal for executing and stopping the selected washing course;
a controller configured to control the display unit such that predetermined information is displayed on the display unit based on signals from the manipulation unit and the command input unit; and
a power input unit configured to input power to the laundry machine,
wherein when the manipulation unit is rotated by a predetermined angle or more or when a signal input through the command input unit is maintained for a predetermined time or more, power from an external power source is supplied to the laundry machine via the power input unit,
wherein when one of the washing course icons is selected in response to the rotation of the manipulation unit and the selected washing course is input through the command input unit, the controller controls the display unit such that an option setting screen is displayed in the display zone,
wherein the controller controls the display unit such that the start icon is displayed on the option setting screen, and
wherein the controller controls the display unit such that the start icon is activated only on the option setting screen in response to rotation of the manipulation unit.

2. The laundry machine according to claim 1, wherein the display unit is configured to selectively display the input items in a circular display zone corresponding to the manipulation unit, the manipulation unit being formed in a circular ring shape, and the controller controls the display unit such that the input items are displayed in a circumferential direction of the circular display zone.

3. The laundry machine according to claim 2, wherein the controller controls the display unit such that information about the selected washing course and information about the selected option are selectively displayed at a central part of the circular display zone.

4. The laundry machine according to claim 1, wherein, when the signal input through the command input unit is maintained for the predetermined time or more in a state in which the power is supplied to the laundry machine, the power input unit interrupts a supply of power to the laundry machine from the external power source.

5. The laundry machine according to claim 1, wherein input of power, selection of a washing course, change of an option, start of the selected washing course, and setting of delay time are performed by rotating the manipulation unit and inputting a command through the command input unit.

6. The laundry machine according to claim 1, wherein the command input unit is provided at a front surface of the manipulation unit so as to be located at one side of the manipulation unit in a circumferential direction thereof, the manipulation unit being formed in a circular ring shape.

7. The laundry machine according to claim 6, wherein the command input unit is provided at the front surface of the circular ring-shaped manipulation unit so as to be located at a 6 o'clock position, and a command is input when the command input unit is pushed by a user.

8. The laundry machine according to claim 1, wherein when power is input to the laundry machine, the controller controls the display unit such that a course selection screen is displayed in a circular display zone, and the controller controls the display unit such that a plurality of washing course icons and an additional course icon are displayed on the course selection screen in a circumferential direction of the display zone.

9. The laundry machine according to claim 8, wherein the controller controls the display unit such that the washing course icons and the additional course icon displayed in the display zone are sequentially lit in response to rotation of the manipulation unit.

10. The laundry machine according to claim 9, wherein, when a signal is input through the command input unit in a state in which the additional course icon is lit, the controller controls the display unit such that a plurality of predetermined additional washing course icons other than the washing course icons is displayed in the circumferential direction of the display zone.

11. The laundry machine according to claim 9, wherein the controller controls the display unit such that one or more selected from among an option icon accompanying the selected washing course, a delay icon, and the start icon are displayed on the option setting screen in the circumferential direction of the display zone.

12. The laundry machine according to claim 11, wherein a back icon is further displayed on the option setting screen, and
when the back icon is selected in response to the rotation of the manipulation unit and a signal is input through the command input unit, the controller controls the display unit such that the course selection screen is displayed again in the display zone.

13. The laundry machine according to claim 11, wherein, when the delay icon is selected in response to the rotation of the manipulation unit and a command is input through the command input unit, the controller controls the display unit such that a delay setting screen is displayed in the display zone in a form of an analog clock, a delay time is selected in response to the rotation of the manipulation unit, and delay setting is completed through the command input unit.

14. The laundry machine according to claim 1, wherein the washing courses comprise one or more selected from among normal washing, baby clothes, boiling, speed wash, allergy care, steam cleaning, functional clothes, bedding cleaning, cold water wash, lingerie/wool, bedclothes, and rinsing/spin drying.

15. The laundry machine according to claim 1, wherein the option comprises one or more selected from among a washing intensity, a wash water temperature, a number of rinses, and a spin-drying intensity.

* * * * *